US012456350B2

(12) United States Patent
Fong et al.

(10) Patent No.: US 12,456,350 B2
(45) Date of Patent: *Oct. 28, 2025

(54) SYSTEM AND METHOD FOR PROCESSING AND PROVIDING CASINO JACKPOT WIN FORMS

(71) Applicant: Everi Payments Inc., Austin, TX (US)

(72) Inventors: Adam Fong, Las Vegas, NV (US); Justin Nelson, Las Vegas, NV (US); Ryan May, Las Vegas, NV (US)

(73) Assignee: Everi Payments Inc., Las Vegas, NV (US)

(*) Notice: Subject to any disclaimer, the term of this patent is extended or adjusted under 35 U.S.C. 154(b) by 297 days.

This patent is subject to a terminal disclaimer.

(21) Appl. No.: 18/127,142

(22) Filed: Mar. 28, 2023

(65) Prior Publication Data

US 2023/0230451 A1 Jul. 20, 2023

Related U.S. Application Data

(63) Continuation-in-part of application No. 17/723,682, filed on Apr. 19, 2022, now Pat. No. 11,893,859.

(60) Provisional application No. 63/178,109, filed on Apr. 22, 2021.

(51) Int. Cl.
*G07F 17/32* (2006.01)
*G06Q 40/12* (2023.01)
*G06Q 50/34* (2012.01)

(52) U.S. Cl.
CPC ....... *G07F 17/3258* (2013.01); *G06Q 40/123* (2013.12); *G06Q 50/34* (2013.01); *G07F 17/3223* (2013.01); *G07F 17/3239* (2013.01)

(58) Field of Classification Search
CPC ............. G07F 17/3258; G07F 17/3223; G07F 17/3239; G07F 17/3218; G07F 17/3225; G07F 17/323; G07F 17/3241; G07F 17/329

See application file for complete search history.

(56) References Cited

U.S. PATENT DOCUMENTS

| | | | |
|---|---|---|---|
| 5,505,461 | A | 4/1996 | Bell |
| 6,709,333 | B1 | 3/2004 | Bradford et al. |
| 6,935,951 | B2 | 8/2005 | Paulsen |
| 6,984,175 | B2 | 1/2006 | Nguyen et al. |
| 8,221,224 | B2 | 7/2012 | Nguyen et al. |
| 8,246,450 | B2 | 8/2012 | Nguyen et al. |
| 8,517,823 | B2 | 8/2013 | Nguyen et al. |

(Continued)

OTHER PUBLICATIONS

Personal digital assistant—Wilcipedia, p. 2/10. Published Jul. 23, 2018 <https://en.wikipedia.org/w/index.php?title=Personaldigitalassistant&oldid=851540806> Accessed Sep. 8, 2020. (Year: 2018).

*Primary Examiner* — Kevin Y Kim
(74) *Attorney, Agent, or Firm* — Snell & Wilmer LLP

(57) ABSTRACT

Relative to a gaming system, a jackpot processing server is configured to generate at least one gaming win reporting form, such as a W2G, in response to a gaming win by the player. The jackpot processing server is configured to store that form and provide access to the form. A code may be provided to the player which is used to generate a communication link to a webserver for accessing the form. Alternatively, the form may be emailed to the player, such as in response to a request to an email server. The email server may be a public email server that communicates to the jackpot processing server via a secure communication module.

20 Claims, 32 Drawing Sheets

(56) References Cited

U.S. PATENT DOCUMENTS

| | | |
|---|---|---|
| 8,727,892 B1 | 5/2014 | Chun |
| 8,753,194 B2 | 6/2014 | Schneider |
| 8,953,200 B2 | 2/2015 | Shuldman et al. |
| 9,652,932 B2 | 5/2017 | Nonaka |
| 9,715,787 B1 | 7/2017 | Sanford et al. |
| 10,109,148 B2 | 10/2018 | Risonoveanu et al. |
| 10,229,559 B2 | 3/2019 | Sanford et al. |
| 10,297,105 B2 | 5/2019 | LeMay et al. |
| 10,319,184 B2 | 6/2019 | Flaherty |
| 10,970,971 B2 | 4/2021 | Oberberger |
| 11,017,639 B2 | 5/2021 | Hanson et al. |
| 11,030,853 B2 | 6/2021 | Fong |
| 11,030,854 B2 | 6/2021 | Alderucci |
| 11,037,398 B2 | 6/2021 | Frenkel |
| 11,069,188 B2 | 7/2021 | Flaherty |
| 11,321,999 B2 | 5/2022 | Kubajak et al. |
| 11,403,915 B2 | 8/2022 | Amaitis et al. |
| 11,455,862 B2 | 9/2022 | Williams et al. |
| 11,580,820 B2 | 2/2023 | Alderucci et al. |
| 2003/0083126 A1 | 5/2003 | Paulsen |
| 2005/0181864 A1 | 8/2005 | Britt et al. |
| 2007/0099696 A1 | 5/2007 | Nguyen et al. |
| 2008/0207296 A1 | 8/2008 | Lutnick et al. |
| 2009/0292641 A1 | 11/2009 | Weiss |
| 2012/0046097 A1 | 2/2012 | Nguyen et al. |
| 2012/0122555 A1 | 5/2012 | Schneider |
| 2013/0275169 A1 | 10/2013 | Acres |
| 2014/0244456 A1 | 8/2014 | Huang |
| 2017/0053489 A1 | 2/2017 | Colvin et al. |
| 2018/0082516 A1 | 3/2018 | Kubajak et al. |
| 2022/0343728 A1 | 10/2022 | Fong et al. |
| 2023/0177921 A1 | 6/2023 | Mikulich et al. |

SYSTEM AND METHOD FOR PROCESSING AND PROVIDING CASINO JACKPOT WIN FORMS

RELATED APPLICATION DATA

The present application is a continuation-in-part of U.S. application Ser. No. 17/723,682, filed Apr. 19, 2022, which claims priority to U.S. Provisional Application Ser. No. 63/178,109, filed Apr. 22, 2021. Each of these prior applications is incorporated herein by reference in its entirety.

FIELD OF THE INVENTION

The present invention relates to casino gaming, including casino game awards such as jackpots.

BACKGROUND OF THE INVENTION

Casino winnings may be paid in different manners. For example, relative to a gaming machine which is capable of dispensing monetary winnings or a monetary value ticket or the like, the winnings may be directly awarded and then dispensed to the player. As one example, a player might win $500. Those winnings might be associated with a monetary value credit meter at the gaming machine. The player might then elect to cash-out that balance, including the winnings, as either coins dispensed at the machine or, in most modern gaming machines, a monetary value ticket which can be redeemed.

A casino may desire, however, to validate larger jackpots. In that event, the gaming machine may report a jackpot win to the casino gaming system. However, the jackpot winnings may not be awarded until casino personnel validate the win.

In addition, some jurisdictions like the U.S. require that a casino report player winnings over certain thresholds. For example, relative to a gaming machine, this threshold is currently $1200 in the U.S. In a situation where a player wins more than $1200.00, the casino will generally require the player to complete a jackpot winnings form which the casino can then use to report the jackpot win to the Internal Revenue Service of the U.S. government. This form, called a W2G in the U.S., includes information regarding the amount of the win and the player's identity (such as their name and social security number and the like).

One problem for casinos is that the player must later submit a copy of the tax reporting form with their tax return. Thus, a casino must generally provide a copy of the tax reporting form to the player, such as in the form of a receipt. However, players often lose their copy of the form. At tax filing time (usually April 15 of each year in the U.S.), players often bombard casinos with requests for copies of their tax reporting forms.

Other problems currently exist with the processing and payment of jackpots. For example, in the situations where the casino desires to directly pay a jackpot to a player (as opposed to forcing the player to travel to a casino cage to obtain their winnings), the casino must supply customer service personnel with sufficient funds to pay the player. Given the number of jackpots that a casino may need to pay in a day, this creates complexities with keeping the customer service personnel sufficiently funded, but at the same time ensuring that the funds are trackable and remain secure.

Solutions to these and other problems are desired.

SUMMARY OF THE INVENTION

Embodiments of the invention include, but are not limited to, methods and systems for processing jackpots, including providing jackpot-related forms such as tax forms to jackpot winners, suspending jackpot processing, integrating jackpot processing with other features such as loyalty and financial/wallet features and systems, and processing of player tips, such as from jackpot funds.

One embodiment of the invention comprises a system for generating and securely transmitting gaming win reporting forms to a player. In one embodiment, the system comprises a mobile attendant device comprising a processor configured to execute machine readable code, a memory, a display device, at least one user input device and machine-readable code stored in the memory; a jackpot processing system comprising a processor configured to execute machine readable code, a memory, a communication interface, and machine readable code stored in the memory the executable by the processor, wherein the machine readable code of the jackpot processing system is configured to cause the processor thereof to, in response to receiving an indication of an occurrence of a designated game win by a player, generate one or more game win forms relating to the game win and generate a code which designates an access location of the one or more game win forms, and wherein the machine readable code of the mobile attendant device is configured to cause the processor thereof to display the code via the display device thereof to the player, and wherein the machine readable code of the jackpot processing system is further configured to cause the processor thereof to receive a request for access to the one or more game win forms from a player computing device generated from input of the code to the player computing device, and transmit information representing the one or more game win forms to the player computing device in response to the request.

Another embodiment of the invention comprises a system for generating and securely transmitting gaming win reporting forms to a player comprising: a jackpot processing server comprising a processor configured to execute machine readable code, a memory, a communication interface, and machine readable code stored in the memory the executable by the processor; a public facing email server in indirect communication with the jackpot processing server via a secure communication module; wherein the jackpot processing server is configured to, in response to receiving an indication of an occurrence of a designated game win by a player, generate one or more game win forms populated with the information regarding the player and information regarding the game win, and the public facing email server is configured to, in response to a forms request received from a remote communication device of the player, transmit a request for information regarding the one or more game win forms from the jackpot processing server via the secure communication module and, in response to receiving the information from the secure communication module, generate and send an email to the player with information regarding the one or more game win forms.

Another embodiment of the invention comprises a method for generating and transmitting gaming win reporting forms to a player. In one embodiment, the method comprises the steps of: generating, at a jackpot processing server, a gaming win reporting form in response to a gaming win by a player; storing, in a database associated with the jackpot processing server, the gaming win reporting form; receiving, at a public facing email server, a request to access the gaming win reporting form from a player's computing device; transmitting, from the public facing email server to a secure communication module, a request for the game win reporting form; transmitting, from the secure communication module to the jackpot processing server, the request for the game win reporting form; transmitting, from the jackpot processing server to the public facing email server via the secure communication module, information representing the game win reporting form; and generating and transmitting, from the public facing email server, an email providing the game win reporting form to the player.

Further objects, features, and advantages of the present invention over the prior art will become apparent from the detailed description of the drawings which follows, when considered with the attached figures.

DESCRIPTION OF THE DRAWINGS

FIGS. 2-5 are screen shots and flow diagrams relating to an embodiment of jackpot processing in accordance with the invention;

FIGS. 6-17 are screen shots and flow diagrams relating to an embodiment of jackpot process suspension in accordance with the invention;

FIGS. 18-24 are screen shots and flow diagrams relating to an embodiment of jackpot processing and secondary service integration in accordance with the invention;

FIGS. 25-29 are screen shots and flow diagrams relating to an embodiment of jackpot pouch management in accordance with the invention; and FIGS. 30-31 are screen shots and flow diagrams relating to an embodiment of a tipping feature in accordance with the invention.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention include, but are not limited to, methods and systems for processing jackpots, including providing jackpot-related forms, such as tax forms, to jackpot winners, suspending jackpot processing, integrating jackpot processing with other features such as loyalty and financial/wallet features and systems, and processing of player tips, such as from jackpot funds.

Figure 1A:
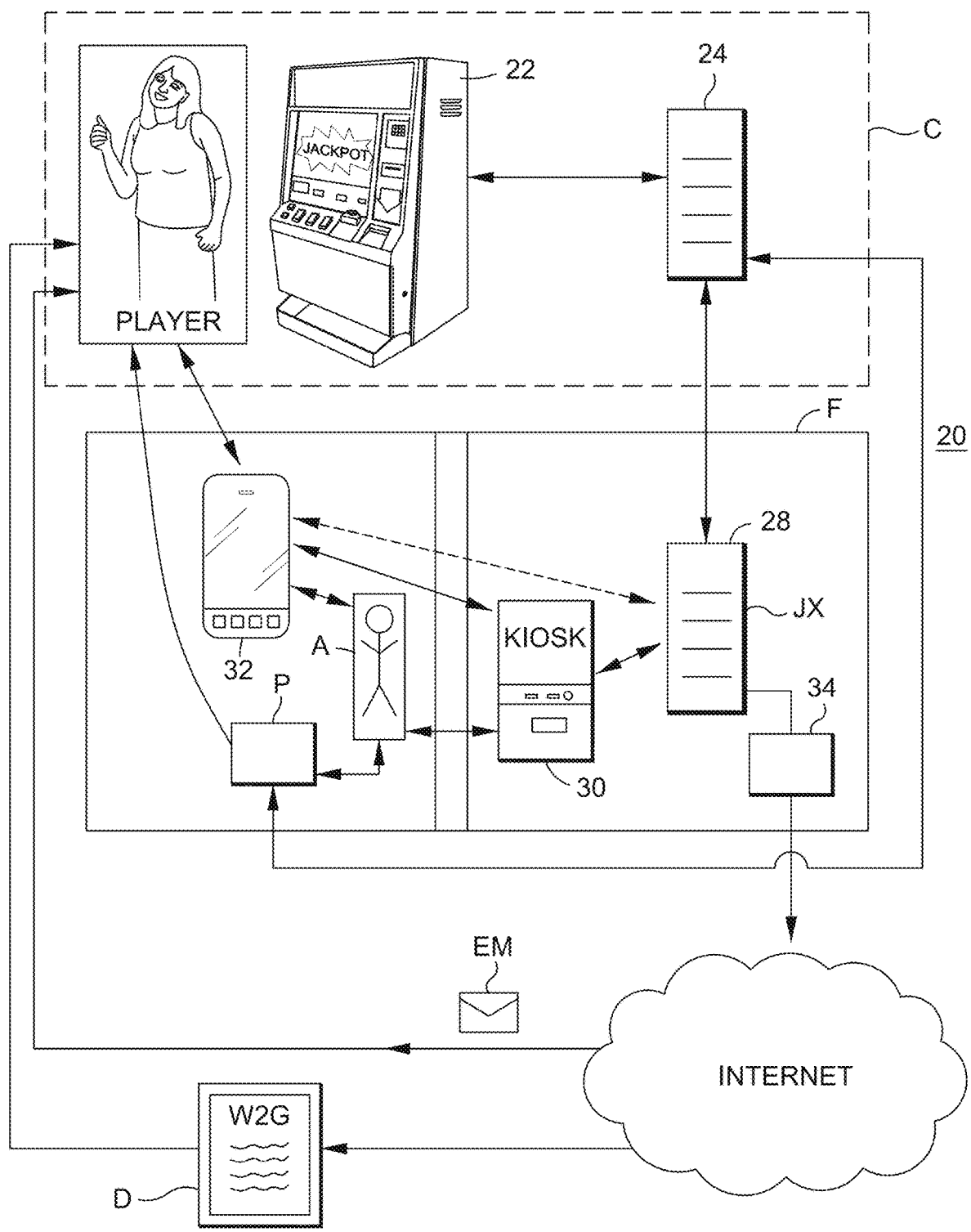
FIGS. 1A and 1B are diagram of systems in accordance with embodiments of the invention.

FIG. 1A illustrates one embodiment of the invention, which comprises a system 20. The system 20 may be referred to as a gaming system. As noted below, portions of the system might belong to or be operated by a casino (or the owner thereof) or entities other than a casino, and might be on-site or off-site as to the casino. In one embodiment, the system 20 may comprise elements associated with a casino, while other elements might be associated with third parties, such as a casino vendor or financial processor.

As indicated, a casino C may include one or more devices and/or systems and may be associated with one or more physical locations. In one embodiment, the casino C may include one or more gaming devices 22. Such gaming devices 22 may have various forms and be configured to present a wide variety of games. For example, the gaming devices 22 might comprise "slot" type gaming machines (having mechanical or video-simulated reels), video poker gaming machines, or other types of gaming machines which are now known or later developed. In general, the gaming devices 22 are preferably configured to present one or more games (generally games of chance or games that include a skill component but which are still predominantly games of chance), such as in exchange for the placement of a wager.

In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits). The awards might comprise, for example, awards of monetary value credits. Awards of a large size may be referred to as a "jackpot" award. In one embodiment, smaller awards might be awarded to the player as monetary value credits which are associated with a monetary value credit balance at the gaming machine. The player may be permitted to cash-out those credits, such as to a monetary-value ticket which the player can redeem at a kiosk or cashier station for cash (e.g. coins or currency) or as monetary value associated with a gaming account, bank account or the like. However, as indicated herein, jackpots might be processed in other manners.

The gaming device 22 might be configured as a stand-alone device (such as where the one or more games are presented by execution of machine-readable code by a processor or controller of the gaming machine) or as a server-based device (e.g. where certain information or instructions is generated remotely, such as by a gaming server, and is transmitted to the gaming device) for presenting games as Class III games (as defined by the U.S. Indian Gaming Regulatory Act) or as a server-based device for presenting games as Class II games (as defined by the U.S. Indian Gaming Regulatory Act).

The gaming devices 22 might comprise other than gaming machines, and might comprise, for example, gaming tables or other gaming devices. For example, the gaming devices 22 might comprise gaming tables at which card games, dice games, roulette or other games are presented. A casino may have numerous such gaming devices 22, such as located on a casino floor or in other locations.

Referring still to FIG. 1A, the casino C may include one or more systems and/or system elements, such as system servers. For example, the casino C might include one or more casino servers 24. The casino server 24 may comprise a computing device which comprises at least one processor for receiving information, processing information or executing code or software, and generating an output, such as control instructions. The casino server 24 may also include means for storing information or instructions. Such means may comprise one or more memory devices. Such might comprise RAM, ROM (including EPROM, EEPROM, PROM) or other devices now known or later developed. In one embodiment, the servers may comprise or be in communication with one or more mass data storage devices, such as one or more hard drives or the like.

The casino server(s) 24 preferably also includes at least one communication interface, by which it may receive and transmit information. The communication interface(s) may permit communications in accordance with various protocols (TCP/IP, 802.11xx, etc.) and in various forms and over various types of links (wired and/or wireless).

The casino server 24 might actually comprise a system or network of a plurality of elements or devices. For example, the server might comprise a network or system which includes multiple servers and related devices such as data storage devices, user interface features and the like. Such might comprise, for example, a user station which includes a video display and one or input devices (such as a keyboard, mouse or the like). Such a user station may permit an operator to interface with and manage or control the server, such as to change operator settings and the like. The server 24 might also comprise a router and one or more separate computing devices. The functions of the various computing devices might be segregated (including by executing different modules of software which implement different features/functions).

The one or more gaming devices 22 are preferably in communication with the one or more casino servers 24 at one or more times. For example, the gaming devices 22 and the one or more casino servers 24 may be linked via one or more communication links. These communication links may be wired and/or wireless and may be dedicated, shared, part of a LAN, WAN or other network, such as an internal casino network.

The casino server(s) 24 may be configured to implement accounting and ticketing functionality. In such a configuration, the gaming devices 22 may communicate with the casino \ server 24, such as when seeking to print a monetary value ticket upon a cash-out request of a player (such as to create a ticket record and associated amount), or when a player seeks to redeem a monetary value ticket at the gaming machine (such as to validate the ticket and its amount). The casino server 24 may, for example, generate and maintain records of monetary value tickets, including their amounts, whether they have been cashed-out, etc., and/or may perform other functionality, such as accounting functionality (tracking and reconciling monetary value provided to the gaming devices 22, amounts wager, amounts won, amounts cash-out, etc.).

The casino server(s) 24 may also implement player tracking functionality. For example, the gaming devices 22 may communicate with the casino server 24 to report player activity. The casino server 24 may maintain one or more player accounts, such as player loyalty accounts with game play information and loyalty awards, or monetary value accounts, such as accounts with associated monetary value that can be access by the player.

The casino server 24 may also implement game functionality. For example, the gaming devices 22 may communicate with the casino server 24, such as to obtain game information, including game outcome information, to facilitate progressive jackpots or other gaming functionality.

As illustrated in FIG. 1A, the system 20 preferably includes a financial system F. Elements of this system may be operated by an entity which is separate from the casino and one or more of the element of the financial system F might be located at the casino or be remote therefrom. In other embodiments, financial system F might be part of the casino C, including being operated by the casino.

In one embodiment, the financial system F comprises one or more financial servers 28 (which may also be referred to as a jackpot processing server or the like), one or more kiosks 30, and one or more mobile transaction devices 32. In general, the financial server 28 may be configured to facilitate various requested financial transactions. The financial system F may include one or more databases which are configured to store information.

The kiosks 30 may have various configurations. In one embodiment, the kiosk 30 comprises a housing, one or more devices for receiving player input and/or displaying or otherwise providing information to a player, and at least one credit dispensing mechanism. The information input/output devices may include, for example, an electronic touch-screen video display. Other input/output devices may include one or more push-buttons, keypads, keyboards and/or other elements. The credit dispensing mechanism may comprise, but it not limited to one or more of: a currency dispenser, a coin dispenser, a ticket or other media dispenser (such as a magnetic card dispenser), or a media writer (such an RFID encoder or the like).

In one embodiment, the kiosk 30 includes at least one processor for executing machine readable code or software, and at least one memory device for storing machine readable code or software for execution by the processor. In one embodiment, the kiosk 30 includes at least one communication interface, such as for establishing a communication link with one or more other devices, such as the financial server 28. The kiosk 30 is preferably located within the casino C, such as where a plurality of kiosks 30 are located about the casino floor for access by players and/or attendants, as described below.

The mobile device 32 may comprise, for example, a tablet, but might also comprise a PDA or phone, or comprise a special-purpose device which is configured to implement the functionality herein. The mobile device 32 preferably comprises a housing, at least one display device (such as a video display), at least one user input device (such as one or more buttons, a touch screen, etc.), a processor, a memory, and a communication interface. Preferably, the communication interface supports or enables wireless communications. The memory may store machine-readable code which, when executed by the processor, causes the mobile device 32 to implement the functionality herein. In some instances, that code may comprise, for example, an "application" which is stored and runs on the mobile device 32. In other embodiments, the mobile device 32 may be configured to implement a web browser which causes the mobile device 32 to implement the functionality herein when the mobile device 32 is in communication with the financial server 28 (or other server/device). As described below, the mobile device 32 may be operated by a casino attendant A and may include various security elements (secure logins, etc.).

In one embodiment, the financial system F is configured to communicate with one or more external devices or networks. For example, the financial system F may communicate with the Internet, and thus individual players, an external banking network, etc.

In one embodiment, as described below, the financial system F may include an email server 34. The email server 34 might be implemented in various manners. In one embodiment, it is implemented 34 separately from the financial server 28, such as via a different computing device. The email server 34 may, for example, be segregated from the financial server 28 or other aspects of the financial system F or casino system C, including by one or more firewalls.

Additional aspects of the system 20 (including the configuration of machine-readable code or "software" which is executable by the processors of the various devices of the system 20) will be appreciated from examples of use thereof as described below.

Additional details of the invention will now be described.
Jackpot Processing with Forms Access One aspect of the invention is the processing or generation of jackpot related forms, including the generation of player-related forms such as tax forms, and configurations of providing such forms to the player.

In one embodiment, a notification of a gaming machine jackpot is reported and/or received. As one example, a player may play a gaming device 22 such as that illustrated in FIG. 1A. The player may obtain a winning game outcome.

The winning outcome and/or associated award may be reported, such as by the gaming device 22 to the casino server 24. If the winning game outcome has an award over a designated amount, then either the gaming device 22 and/or casino server 24 may detect or flag the outcome or award as requiring secondary validation, reporting or the like.

In one embodiment, the jackpot event is reported from the casino server 24 to the financial server 28. Casino personnel may also be alerted to the jackpot win, such as by the casino server 24 and/or financial server 28. An attendant may obtain a mobile processing device 32 and travel to the gaming device 22 that the player is playing. The attendant may log into the device and then obtain information about the jackpot award. This information may be provided to the mobile processing device 32 from the financial server 28. In one embodiment, one or more jackpot processing forms may be displayed to the attendant. These forms may be transmitted to the mobile processing device 32 and/or reside on the device, where those forms are preferably auto-populated with information which is stored by or obtained by the financial server 28 (either directly or as gathered from the casino server 24). For example, the forms may include a W2G form which is populated with information regarding the player and the amount of the winnings (the information regarding the amount of the winnings and the player may be obtained, for example, by the financial server 28 from the casino server 24, including based upon the player's casino rewards account). Alternatively, or in addition, the attendant may manually gather information from the player or have the player enter the information into the mobile processing device 32 in order to complete the required forms (these forms may include government required reporting forms, casino release forms or other documents). For example, if the player does not have a player tracking account, the attendant may need to obtain the player's identity information directly.

In one embodiment, once the forms are complete, the attendant captures the player's signature (directly onto the forms or for association with the forms). This may comprise having the player sign via a touchscreen of the mobile processing device 32. The completed form(s) or associated information is then transmitted from the mobile processing device 32 back to the financial server 28. The financial server 28 may store the completed forms, such as in association with one or more transaction records, may transmit the forms to the casino, and/or may transmit the forms to the appropriate authorities (such as the IRS). Also, once the forms have been completed, if the jackpot is a 'hand pay' jackpot, the attendant may be notified that the jackpot can be paid or issued.

If not already done, the financial server 28 preferably collects personal information regarding the player. This information may be obtained from the casino server 24, such as from a player tracking account for the player. Alternatively, the information might be obtained from the player, such as based upon information that the player provided to the attendant and which was input to the mobile processing device 32. This information may comprise one or more of the player's name, address, phone number, email address, social security number and the like.

In one embodiment of the invention, one or more jackpot-related forms are made available to the player. Most preferably, the one or more forms are made available to the player in a secure manners.

In one embodiment, a player may be required to sign up or consent to having the one or more jackpot-related forms provided to them in one or more particular manners. This may comprise, for example, the player completing an enrollment form. This may comprise the player reviewing an enrollment form and accepting the terms and conditions thereof. In one embodiment, the enrollment process may comprise the capture of player related information, such as the player's email address. The player may also create or be assigned a password or other security/access information.

In one embodiment, as to each enrolled player, the system 20 is preferably configured to facilitate access by, or provide to, the player one or more jackpot related forms. Described below are various embodiments of methods and systems therefor.

In one embodiment, when the player is enrolled, the system 20 is configured to send an email EM (such as via the email server 34) to the player with a website link. The player can access the link from their email and click on the link, thus enabling a connection (such as via a web browser of their computing device or phone) to the system 20, such as the email server 34. The link preferably enables a connection to forms D which are stored in association with the system 20 (such as in association with the email server 34). The forms may, for example, be in PDF format and the player may be permitted to open them, download them and/or print them.

In one embodiment, the method of permitting the player to access their jackpot-related forms may include one or more authentication or validation features. For example, in one embodiment, when the player clicks on the link that was emailed to them, a verification code is transmitted to them, such as to their phone (such as by text message) or via a second email. The player may be required to input the verification code as part of the form access process, where the verification code essentially comprises a password for access to the forms. This authentication feature might be required or might be optional, such as based upon player selection during the enrollment process (or as later modified by the player).

In one embodiment, an email might be generated by the system 20 and transmitted to the player each time one or more new forms are made available for the player. For example, a first email might be transmitted to the player when jackpot forms have been generated for the player relative to a first jackpot at a first time, and a second email might be transmitted to the player when jackpot forms have been generated for the player relative to a second jackpot at a second time. In addition, at the end of each year, "year-end" forms may be generated for the player and another email may be sent to the player to facilitate the player's access to those forms. In one embodiment, each email may provide a link to a particular location where specific or designated player documents are accessible, while in others, the links may all provide access to a common location, such as a folder, which contains all forms relating to the player. In this configuration, for example, the email to the player may include a hyperlink. When the player clicks on the hyperlink, as is well-known, the hyperlink may cause, such as via a web-browser, the player's computing device to form a communication link with a remoting computing device having the jackpot related forms stored therewith. Once the communication link is established, the web browser might automatically cause the linked form to be displayed (such as for viewing, printing or downloading) or might cause a folder of forms to be display, from which the player may make selections of forms for viewing, printing, downloading or the like.

Figure 2:
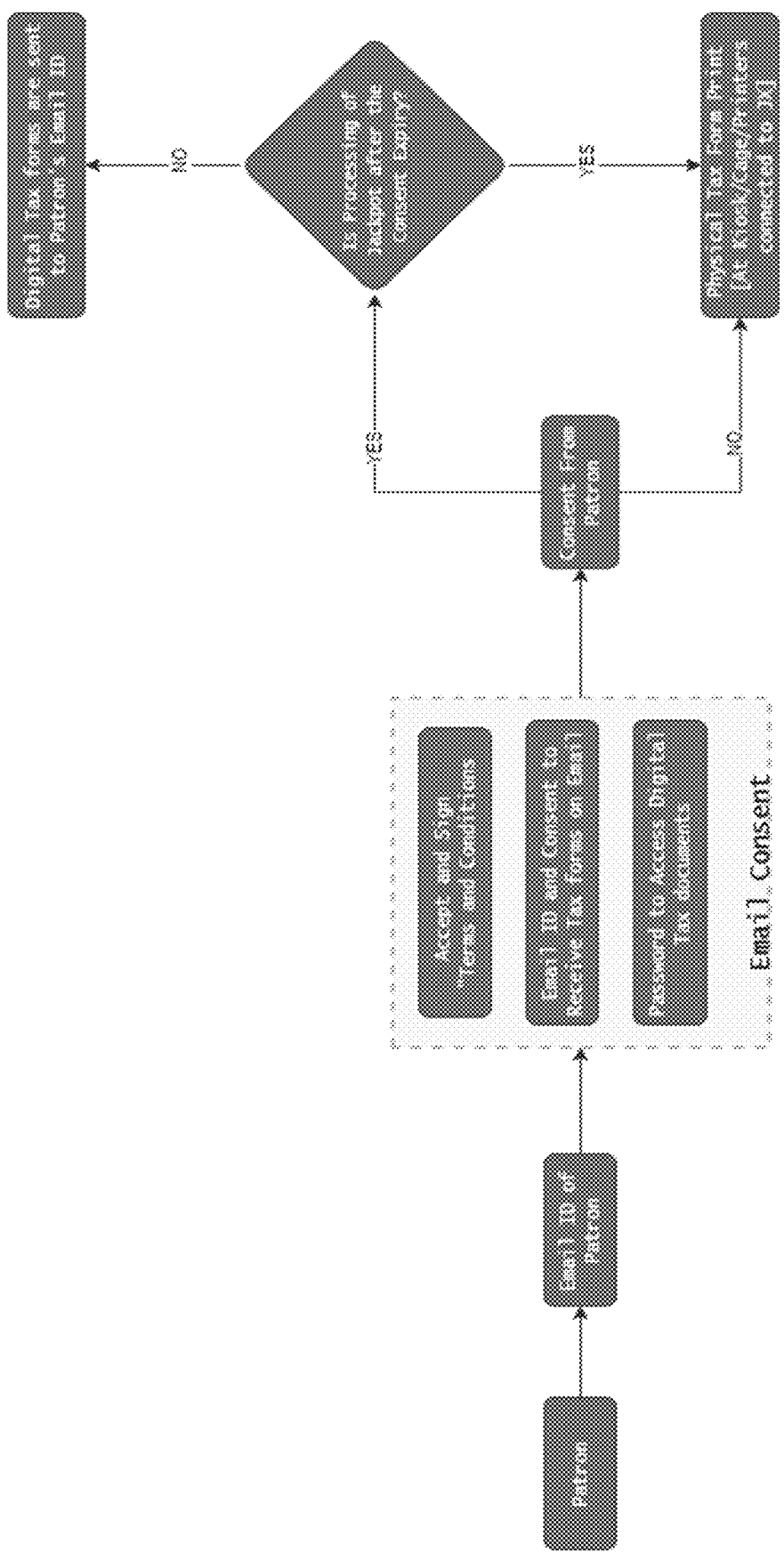
Figure 3:
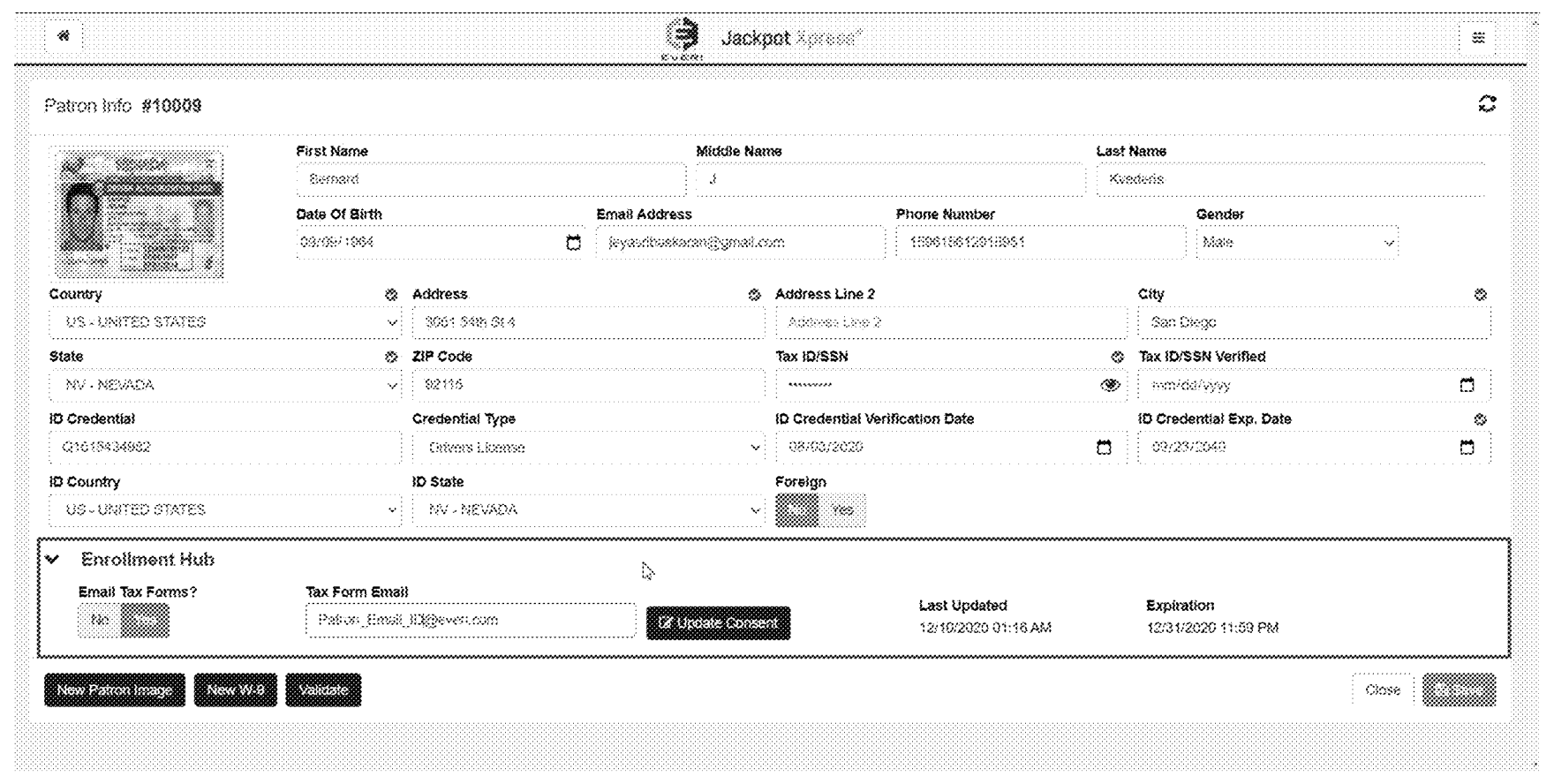
Figure 4:
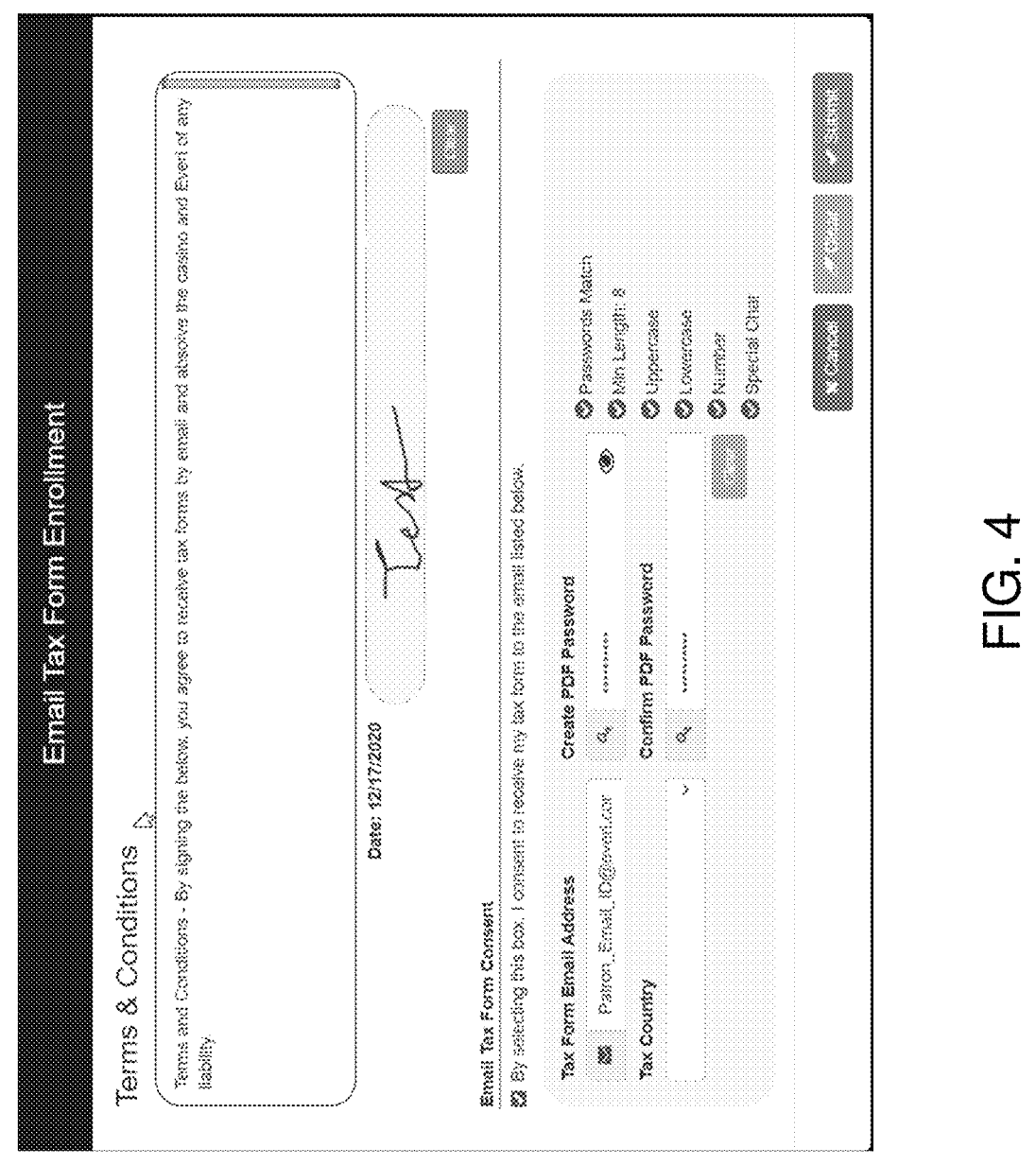
Figure 5:
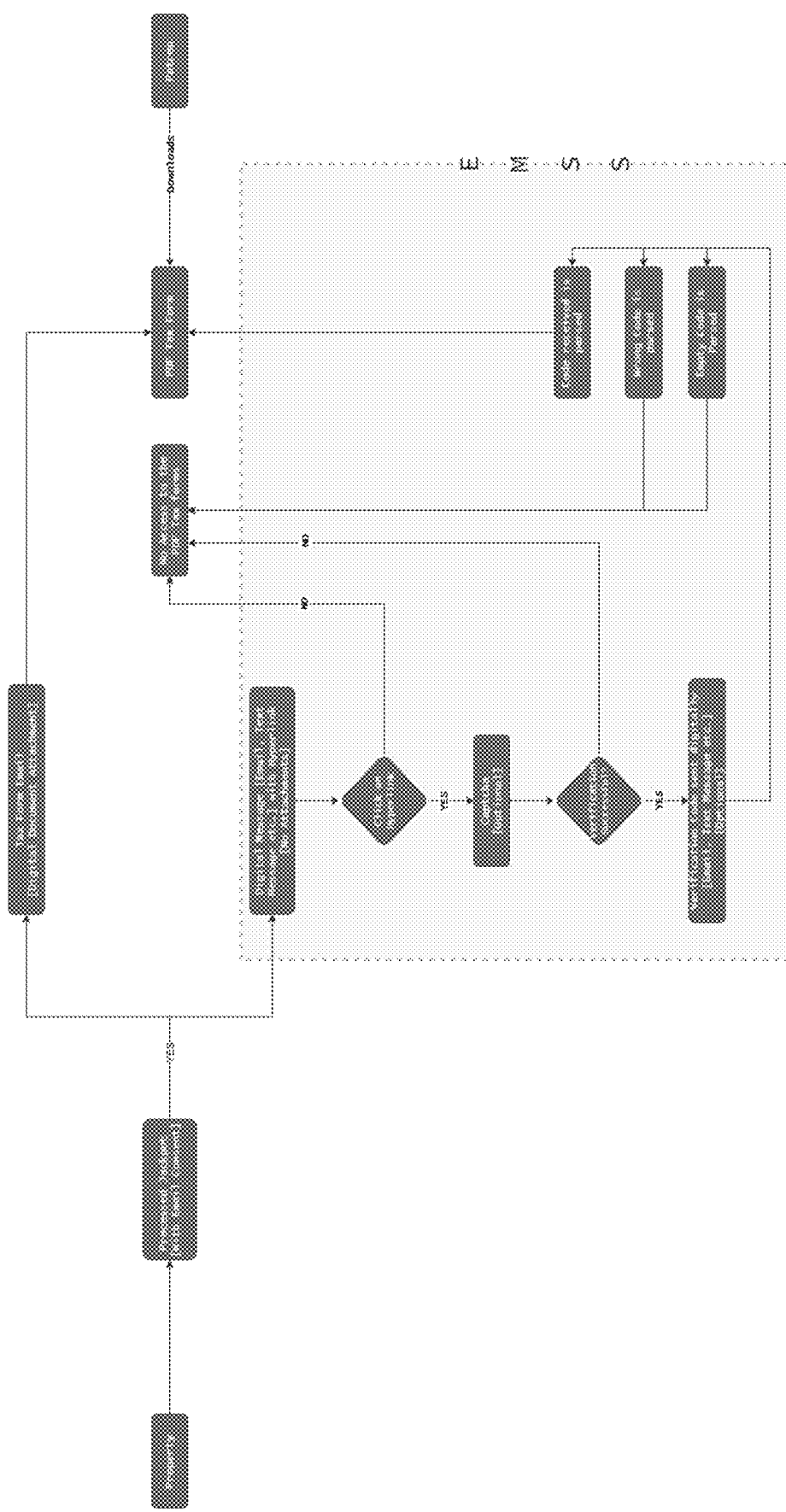

FIGS. 2-5 are screen shots and flow diagrams relating to an embodiment of jackpot processing in accordance with the invention, wherein FIG. 2 is a flow diagram of an electronically implemented method of obtaining a player consent for electronic form processing, FIG. 3 illustrates an electronic player record with associated player information, including player consent status and contact details, FIG. 4 illustrates a terms and conditions electronic acceptance interface, such as for consenting to electronic transmission of tax forms as described herein, and FIG. 5 is a flow diagram of an electronically implemented method of processing player jackpot forms in accordance with the invention.

In another configuration, as part of processing, the jackpot a code may be generated, such as by the financial server 28. This code may be transmitted to the attendant's device 32. In a preferred embodiment, the code is machine-readable, such as comprising an optically readable barcode. The barcode may represent the location of one or more jackpot related forms, such as in the form of a network link (such as a website hyperlink) to a server at which the forms are stored (such as in an associated database; as one example, the financial server 28 might act as a webserver and provide the forms from the associated database D).

The code may be provided to the player, such as via display on a tablet or other device of an attendant during the processing of the jackpot (such as where the code is generated by the financial server 28 and transmitted to the attendant's device 32). The player might, for example, scan the code with a personal device, such as a scanner, reader, camera or the like of their phone. The player's device may then decode the code to identify the form location—such as the website link, which the player may then use to access the one or more forms. For example, upon decoding the barcode, the identified link may be used to establish communications between the player's device and a webserver, such as via a web browser. This process may also establish a request for the associated form(s), such as from the financial server 28. The financial server 28 may, in response, transmit information which causes the one or more forms to be displayed on a display of the user's device, and/or which may permit the user to store/download, print, etc., the one or more forms.

A particular aspect of this configuration of the invention is that the player may not be required to enroll in a jackpot related forms system (or related system) in order to provide the one or more forms to the player, because the player's email address or other contact information is not required. Instead, forms access is securely provided to the player by direct communication (player being present to read the barcode using their own device).

Additional embodiments of the invention will be described with reference to FIG. 1B, which illustrates a system 20B which is particularly configured to enable web-access of jackpot forms by a player.

In this configuration, the casino C again has one or more servers, such as a casino management server ("CMS") 24A, a casino loyalty server 24B, an accounting server 24C, and/or one or more other servers. The financial server 28 is again in communication with one or more of the casino servers. As described above, various casino devices such as gaming machines 22 (and a wide variety of other devices, including table devices, kiosks, etc.), may communicate with the servers. In this manner, activity at the gaming machines 22 or other devices may be provided to the servers—such as information regarding game play and, as described herein, information regarding jackpot wins.

As one aspect of the invention, the casino C may operate (directly or via a third party) a casino webserver 24D. This webserver 24D may support a website that players may access from remote computing devices (laptops, tablets, phones, desktop computers, etc.).

In one embodiment, the casino C may maintain a player account for each player, such as for those players who have enrolled in the casino's player loyalty system, enrolled for electronic forms as described herein, or otherwise. In one embodiment, a player might access their account via the casino website. Access might be gained, for example, via a web browser of the player's computing device and then entry of a username and password or other access information.

Inside the player's account, the player might be presented with a list of available jackpot forms—whether such comprise forms corresponding to an individual jackpot win or aggregate form information, such as a year-end form. In one configuration, the player might select one or more of those forms. The selections might be configured as links, such as hyperlinks, which connect to a back-end server which maintains the jackpot form information. For example, the casino webserver 24D may be connected to the financial server 28, wherein selection of a particular form at the casino website creates a link to the financial server 28 and the form data which is stored in association therewith, such as in an associated database D. The financial server 28 may respond by transmitting the latest version of the requested jackpot form to the casino webserver 24D, which causes the requested form to be displayed to the player. From their web browser, the player might then also either request to download that form or print that form.

An aspect of this configuration of the invention is a system and method by which a player may electronically access one or more jackpot related forms, at any time. This allows, for example, the player to not only be provided with one or more forms at the time they are generated—such as at the time a jackpot is awarded and processed, but allows the player to later access the one or more forms in a manner which does not require casino personnel to respond to the request.

Another aspect of this configuration of the invention is that the jackpot related forms are maintained in a single database and are provided upon request. This allows, for example, changes to be made to the jackpot related forms in the single database. For comparison, if the jackpot related forms were maintained in the database associated with the financial server 28 and then separately stored at a webserver for retrieval, if the original forms are modified, such as at the financial server 28, the forms at the webserver would then be out of date or inaccurate. The above-described configuration in which forms are provided from the single back-end database in specific response to a request, ensures that the player is provided with the current version of the forms(s).

Figure 1B:
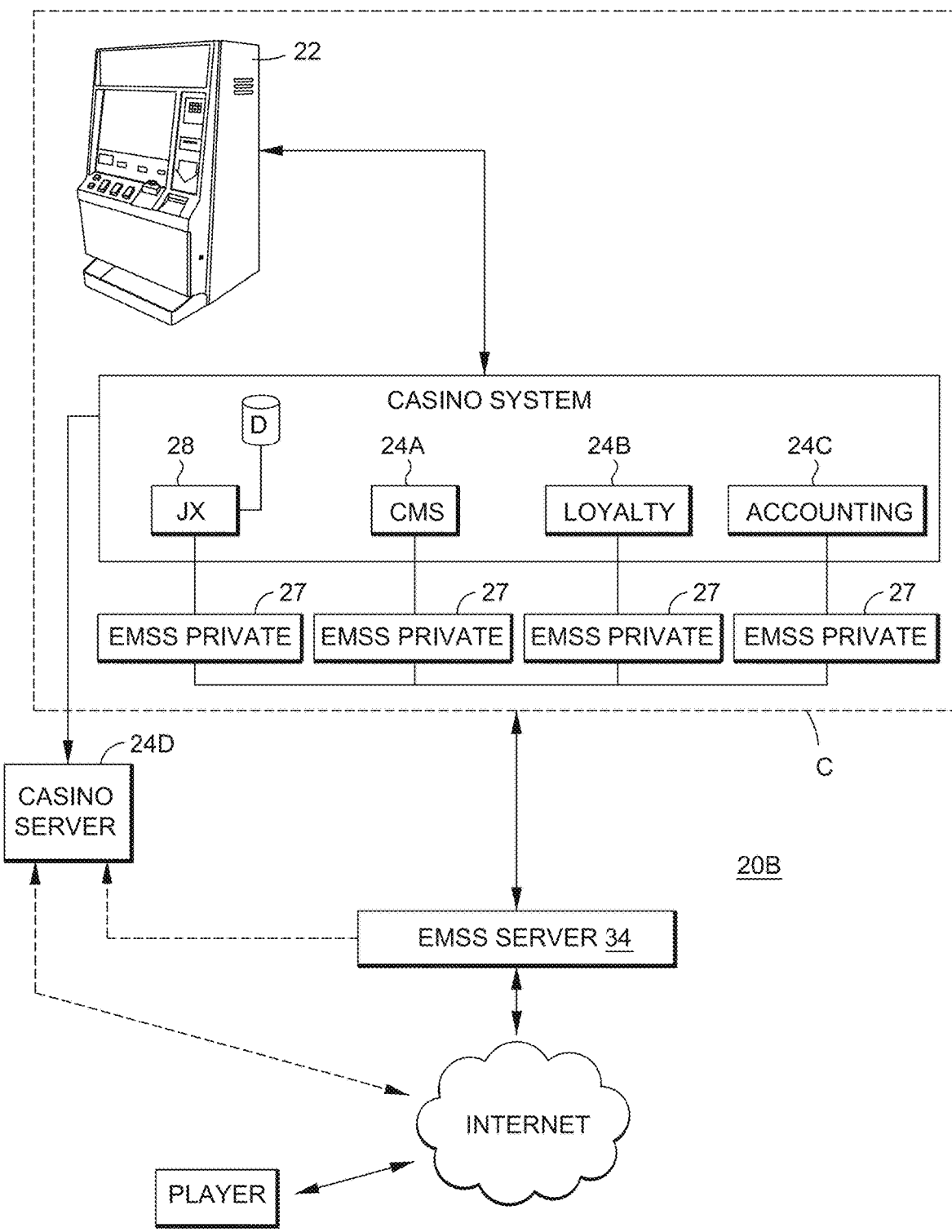

In yet another configuration of the invention, as illustrated in FIG. 1B, the one or more jackpot related forms may be emailed to the player on demand. The player might make a request for one or more jackpot related forms, such as via the casino webserver 24D and associated website, such as described above, or a third party webserver and website. Once again, the player may have an account and they might elect particular forms that they wish to access. In response to the request, the casino webserver 24D (or third party webserver) may make a request for the one or more forms, such as to an email server 34. The email server 34 may, in turn, make a secure request for the one or more forms.

In one configuration, as illustrated, the mail server 34 may essentially communicate a request to the financial server 28 via a public EMSS module using an email secure socket configuration. The email secure socket configuration may be used to communicate the request in an encrypted format. For example, the email secure socket configuration may include at least one secure communications layer configured in accordance with a secure communications protocol, such as and without limitation the secure socket layer (SSL) protocol or transport layer security (TLS) protocol, having encryption capabilities for securely transmitting and receiving encrypted communications, such as those described herein that include sensitive data. As illustrated, the public EMSS module may be associated with the email server 34 (such as comprising a module of software executed by a processor of the server 34 or may comprise hardware configured to implement such functionality) and be located 'outside' of the casino C, meaning that the public EMSS module is located outside of a firewall to the casino network and associated devices. The public EMSS module may communicate via the email secure socket configuration including at least one secure communications layer implementing encryption capabilities in accordance with a secure communications protocol (e.g., SSL, TLS, etc.) to a private EMSS module 27 which is in communication with the financial server 28, and located 'inside' the casino C, meaning that it operates inside the firewall of the casino system(s) (where the private EMSS module 27 may comprise a module of software executed by a processor of a computing device, such as the processor of the financial server 28, or may comprise hardware configured to implement such functionality).

In this configuration, a request for one or more jackpot related forms by the email server 34 is transmitted as a call or request from the EMSS server 34 (via the public EMSS module associated therewith) through the firewall of the casino C to the private EMSS module 27. The private EMSS module 27 requests the forms from the financial server 28. The financial server 28 processes the request, such as by obtaining form information from the associated database, and transmits the response to the private EMSS module 27 which then pushes, transmits or otherwise communicates, the response—preferably the one or more forms—to the public EMSS module and associated email server 34 for emailing to the player. The private EMSS module 27 may communicate the response in an encrypted format using an email secure socket configuration.

In this configuration, the one or more provided forms are preferably provided in an encrypted format, so that the forms are then provided to the player in a secure manner.

As illustrated, a similar EMSS private module 27 may be associated with other of the components of the system, such as the CMS server 24A, loyalty server 24B and/or accounting server 24C, such as when it is desired to communicate therewith in a similar manner.

An advantage of this configuration of the invention is, again, that all forms which are provided to the player are provided from a single database which maintains the most updated version of all of the stored forms (rather than, for example, from a database of forms associated with the email server which may not be up to date as compared to the master database of forms which is associated with the financial server 28).

Relative to the configuration of the invention illustrated in FIGS. 1A and 1B, one advantage of the invention is that the email server 34 is not directly a part of the casino system, including the casino server(s) 24—and is preferably external to the casino system, such as by being on the outside of a firewall thereof. Thus, when a player is accessing their jackpot-related forms, they are not communicating directly with the casino system or server(s) 24, and thus the security of the casino system is not at risk (which could otherwise allow a party to attempt to hack the casino system or server(s) 24 to manipulate the system, etc., risking the security of the gaming-aspects of the casino system and the integrity thereof).

In another embodiment of the invention, the player might have enrolled in a wallet or other financial account with the casino or financial provider. In that event, the player may have a wallet which is maintained by the system 20, such as the financial server 28. This wallet might have various information stored in association with the player or the player's identity, including financial account information, funds information and the like. In one embodiment, jackpot-related forms for the player may be placed into the player's wallet and the player may then access the forms by accessing their wallet (which access may require, for example, one or more aspects of authentication or verification).

Additional aspects of the invention will now be described. As indicated, the invention may be implemented relative to a casino system having one or more gaming machines or other devices for use in presenting wager-based games.

It will be appreciated that the configuration of the invention wherein jackpot related forms, such as tax forms, are electronically generated and made securely available to a player, may be implemented relative to other jackpot processing configurations.

As one example, while in some embodiments a jackpot notification is generated by the system and an attendant travels to the gaming machine to aid in the processing of the jackpot, including payment of the jackpot to the player (and then generation of the forms as described above), in some embodiments, the jackpot may be paid directly to the player by crediting the jackpot amount to the credit meter of the gaming machine. For example, a casino slot accounting system may be configured to log the jackpot and allow the jackpot amount to be credited to the credit meter of the gaming machine. The player might then wager the credited amount in future game play, cash the credited amount out from the gaming machine (such as by transfer of the credits to a wallet, issuance of a monetary-value ticket from the gaming machine, etc.). The jackpot forms, such as the jackpot-related tax forms, might still be processed with the aid of an attendant as described above, but where the attendant then does not have to hand-pay the jackpot to the player. In such a configuration, the one or more jackpot related forms might also then be associated with the player's wallet, where the wallet acts similar to the player account described above, permitting a player to access the wallet and then select forms for access.

In one configuration, the system may be configured to generate a jackpot notification (such as from the gaming machine 22 and/or server 24 in FIGS. 1A and 1B). That notification may be received and trigger (such as at the financial server 28), generation of the jackpot forms, such as tax forms. In some embodiments, the processing of the jackpot, such as the jackpot-related tax forms, might also be automated, such as to eliminate the need for an attendant to travel to the gaming machine.

For example, in one configuration, the financial server 28 may be configured to cause jackpot information to be displayed to the player at the gaming machine 22 (such as on a video display thereof). This information might include information about the jackpot and the player's identity and a request that the player confirm the information and input a signature (such as via a touch-screen of the gaming machine). Upon receipt of player identity confirmation and/or a signature, the financial server 28 might automatically process the jackpot and associated forms and make them available to the player, such as described above. In this configuration, an attendant then does not need to travel to the gaming machine 22 to facilitate processing of the jackpot, including by hand-paying the jackpot to the player and/or capturing player information/signature, etc.

In some configurations, a player might pre-enroll in an express jackpot processing option. This pre-enrollment might allow, when a jackpot is hit, for the system (such as the financial server 28) to send an authentication notification to be send to the player. This notification might comprise, for example, a text message, email or the like, such as may be sent to the player's mobile device or display on the display of the gaming machine 22, which the player uses to verify their identity. As one example, upon receiving a jackpot, a security code might be transmitted to the player's mobile device by a text message and a jackpot notification may be displayed to the player at the gaming machine 22, which notification requests that the player enter the security code. The entry of the security code may be used to authenticate the player, whereupon the jackpot-related forms, such as tax forms, may be generated and made available to the player (with or without requiring that the player provide a signature). In other embodiments, player identity confirmation, signature or the like may be performed by the player's device, such as their mobile device, such as by directly transmitting a request (text/email) to their device seeking confirmation of approval for processing (in such a configuration, the gaming machine 22 may be locked up from further play until the confirmation is received from the player).

As one aspect of player enrollment in the "e"-jackpot related forms option (e.g. where the player accepts the option of having the jackpot related forms made available electronically, rather than provided in paper form at the time of the jackpot, such as using provided player contact/access information), the enrollment may extend to the player regardless of the casino at which they are playing. For example, relative to the configuration illustrated in FIG. 1B, the casino webserver 24D may communicate with the casino systems of a plurality of different casinos—such as Casino A and Casino B, such as might be associated with a single operator. In such a configuration, the player might access their player account and then request forms relating to jackpot wins at either or both Casino A and B, where the casino webserver 24D may, for example, communicate with the JX server 28 of Casino A to obtain jackpot related forms associated with jackpot wins at Casino A, and may communicate with the financial server of Casino B to obtain jackpot related forms associated with Casino B.

This same concept may be applied to casinos of different operators. In such a configuration, each casino may have its own webserver and associated website. However, a third party might operate, such as via a webserver, a website which permits a player to access jackpot related forms from multiple different casinos using the same principle (by connection to the financial servers 28 of the different casinos to obtain the forms associate therewith).

As described above, in a preferred configuration of the invention, "on demand" access to one or more jackpot related forms is provided to a player—preferably in an automated fashion (which does not require manual response by casino personnel). However, such "on demand" access might be coupled event-driven provision of the jackpot forms which is described above, such as where the forms are initially emailed or provided to the player at the time the jackpot is processed.

Jackpot Processing Suspension

Another embodiment of the invention is a jackpot processing suspension feature. As noted above, part of the process of processing a jackpot for a player may involve several steps, including confirming the jackpot, obtaining information from the player, validating the identity of the player, paying the player and the like.

In some embodiments, one or more issues may impede processing of the jackpot. This might result, for example, in the machine remaining out of service for a long time, require that the player travel to a different location, tie up the casino host for a long period of time (thus preventing them from processing the jackpots of other players or the like).

As one example, a casino attendant might travel to a gaming machine to validate a player jackpot. The casino attendant might determine that the player does not have a photo ID, thus preventing the attendant from validating the player and thus completing processing of the jackpot and paying the jackpot out. The casino attendant might wait for the player to locate their ID, such as by travelling to their car or the like to retrieve it. As indicated above, this is undesirable for many reasons.

In accordance with the invention, the jackpot processing may be paused or suspended. In this process, a jackpot record is created with in the system 20, as noted above. This record may include information regarding the jackpot, such as the amount, time, gaming machine that issued the jackpot and the like. The jackpot may be associated with the player (including based upon their name), such as by the casino attendant A using one of the mobile processing devices 32. As part of this process, the attendant A may seek to validate the player's ID or capture other information about the player. If the player is not able to provide the requested information or if the attendant A cannot otherwise process the jackpot, the attendant may suspend the jackpot processing.

In one embodiment, this might be accomplished by the attendant A selecting a "suspend" feature, such as via their mobile processing device 32 (see FIG. 1). In one embodiment, in order to suspend the jackpot processing, the attendant A captures an image of the player (preferably of their face), such as using the mobile processing device 32. The attendant A uploads this image and it is stored in associating with the jackpot record. The system 20, such as via the financial server 28 and/or the mobile processing device 32, then generates and issues a receipt. This receipt preferably has a unique identifier (alpha and/or numeric code, bar code, etc.) associated with it which can be used to uniquely identify the jackpot record. The attendant A can then proceed on to process other jackpots and the gaming machine can be released for play, including by the same or other players.

The player is provided the receipt and can later present the receipt for completion of the jackpot processing, such as at a cashier station. In particular, the player can present the receipt, which the cashier can use to look up the jackpot record. The cashier can then request a photo ID of the player, using that ID (such as by comparing the image of the player on the ID to the appearance of the player) to confirm that the ID belongs to the player, and then also compare the stored image to the ID and/or appearance of the player to confirm that the receipt belongs to the player. The cashier can then complete processing of the jackpot, including the processing of any jackpot related forms, and pay the player their jackpot.

Figure 6:
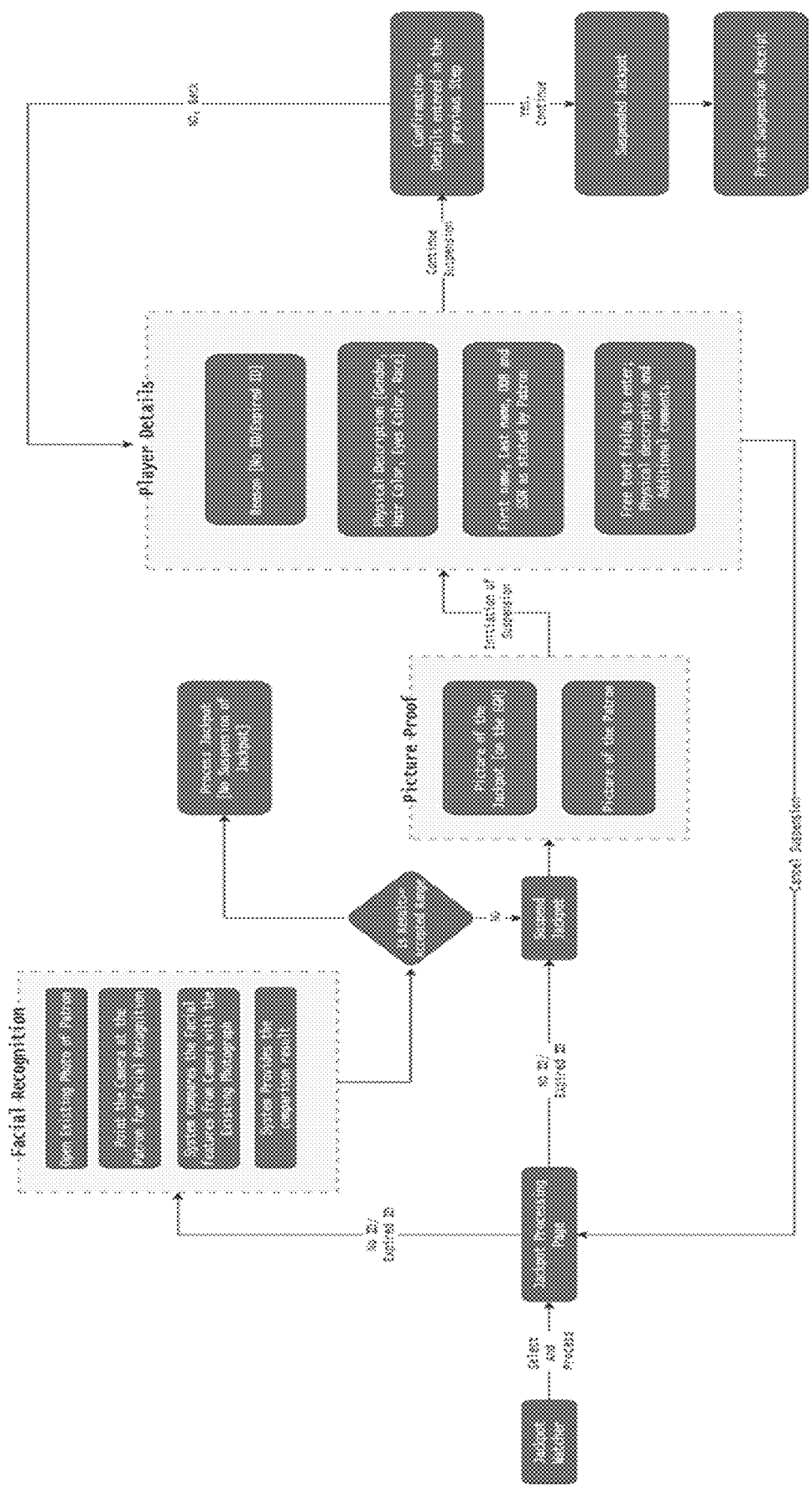
Figure 7:
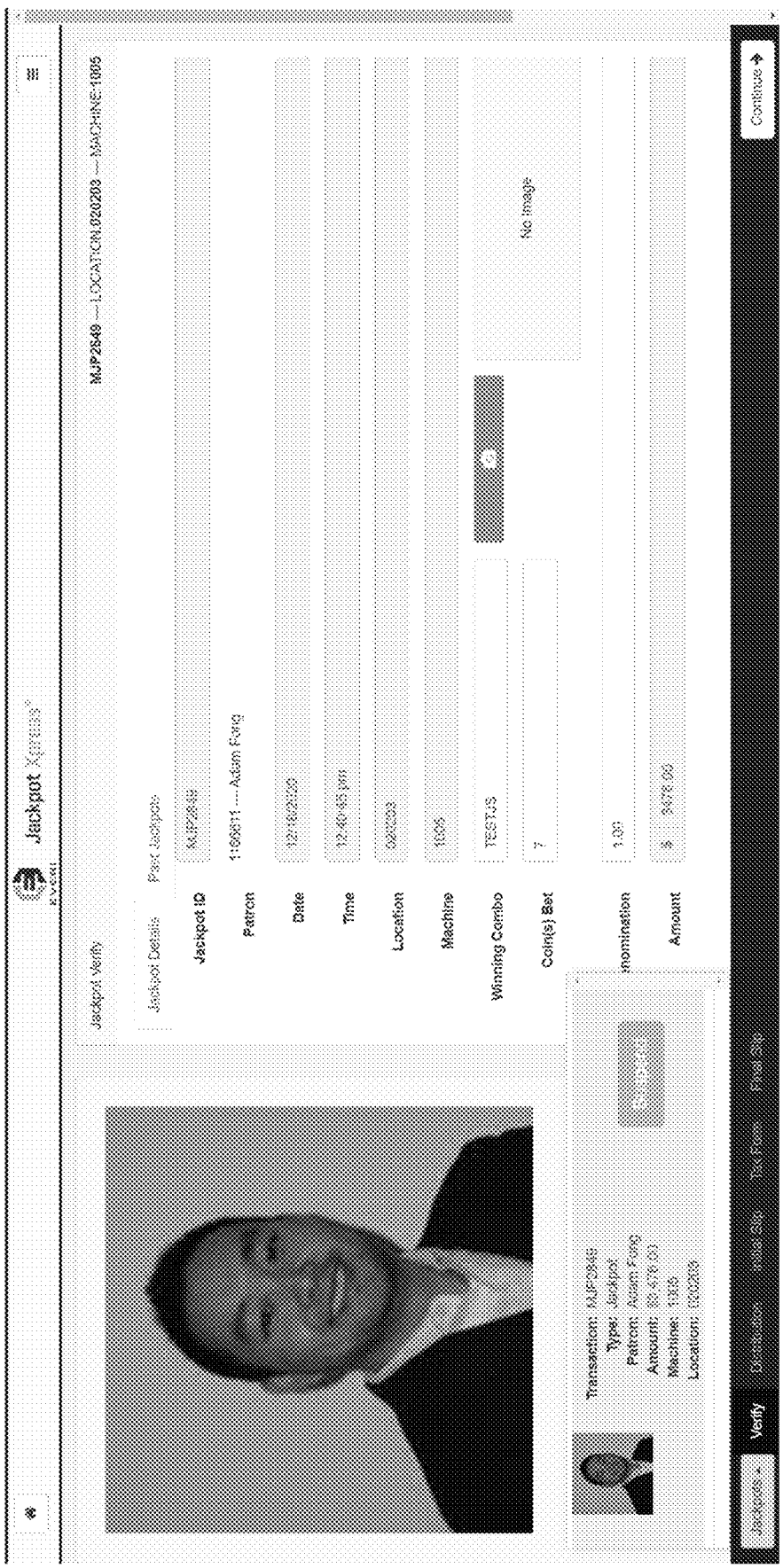
Figure 8:
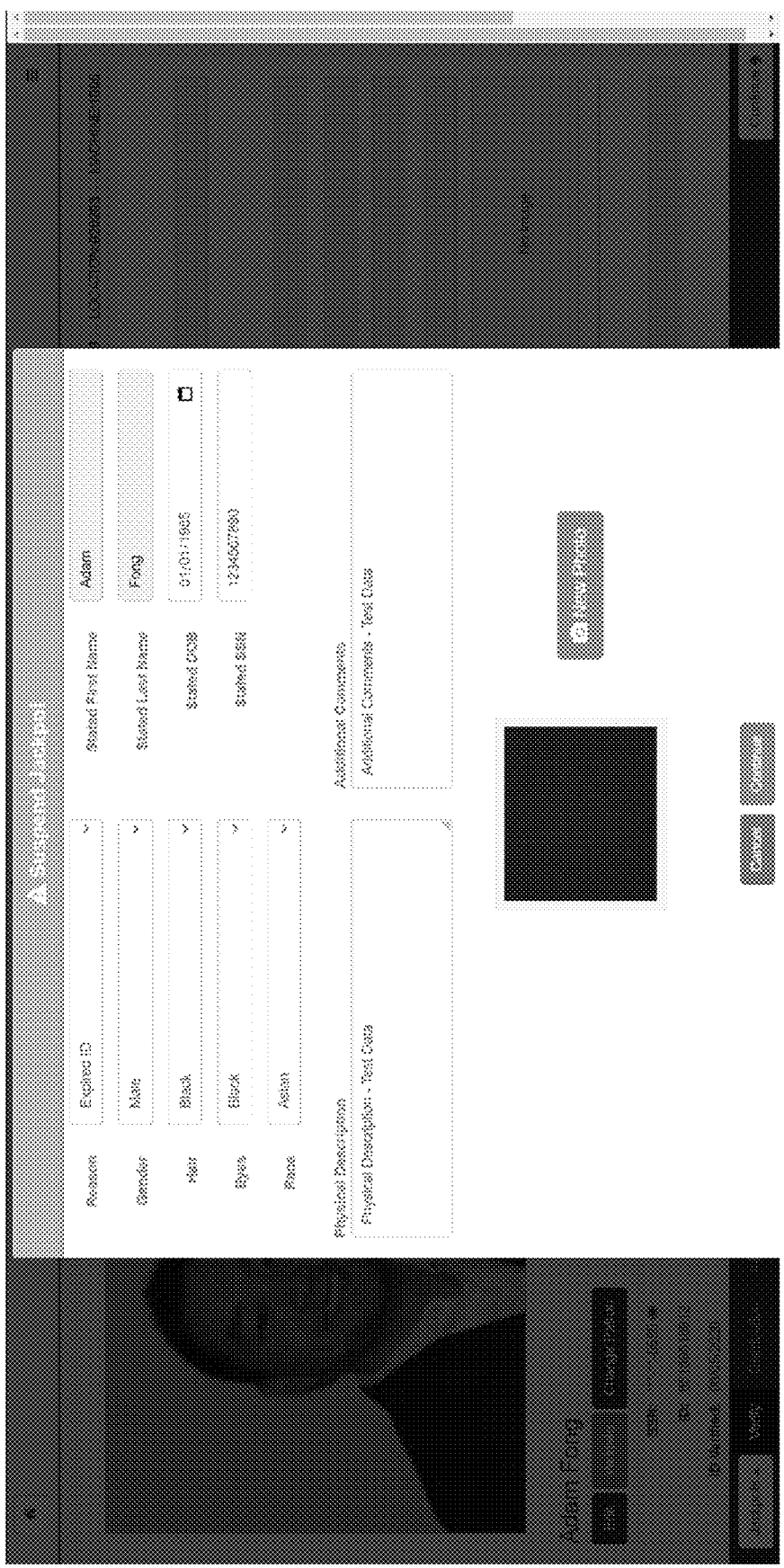
Figure 9:
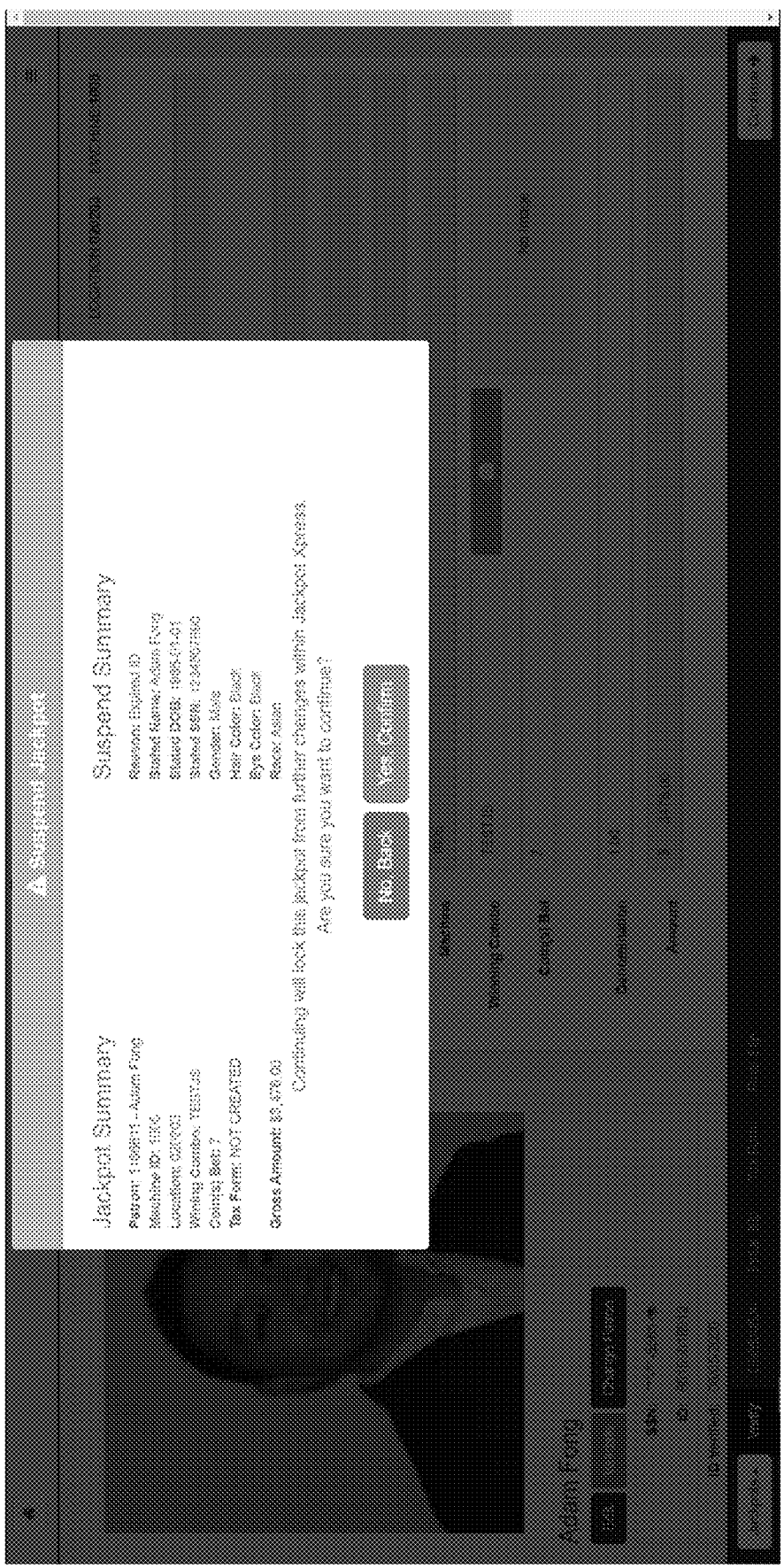
Figure 10:
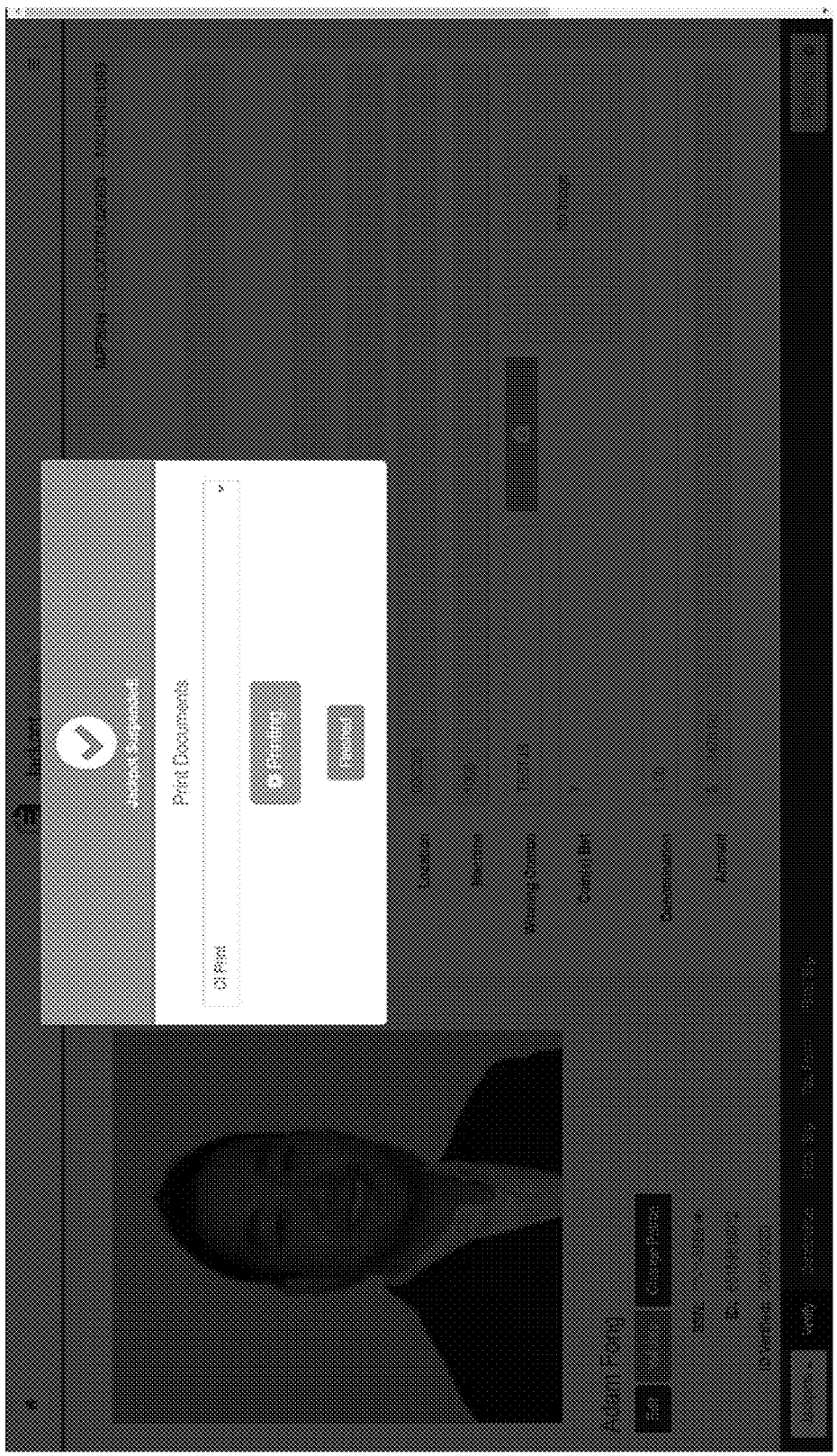
Figure 11:
Figure 12:
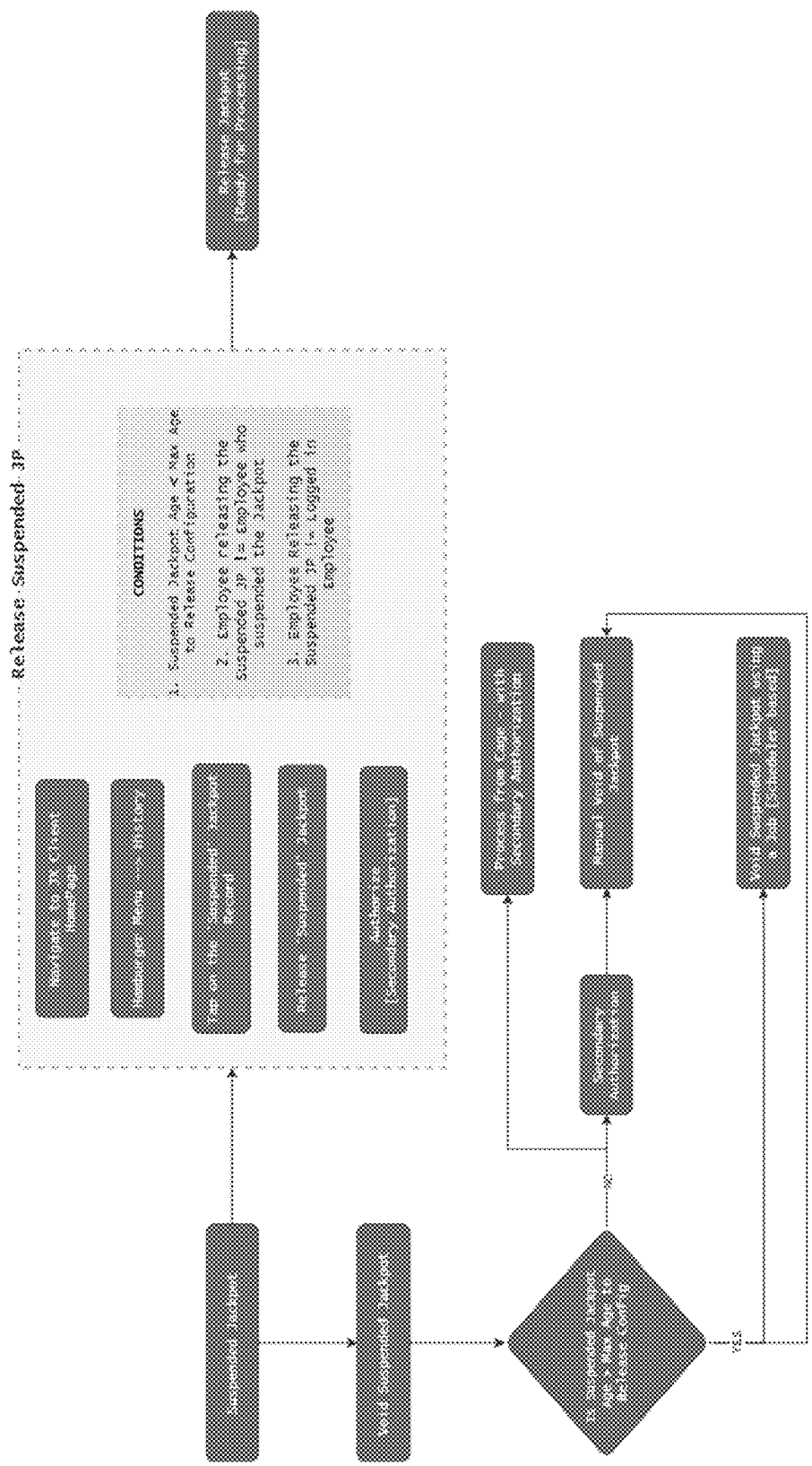
Figure 14:
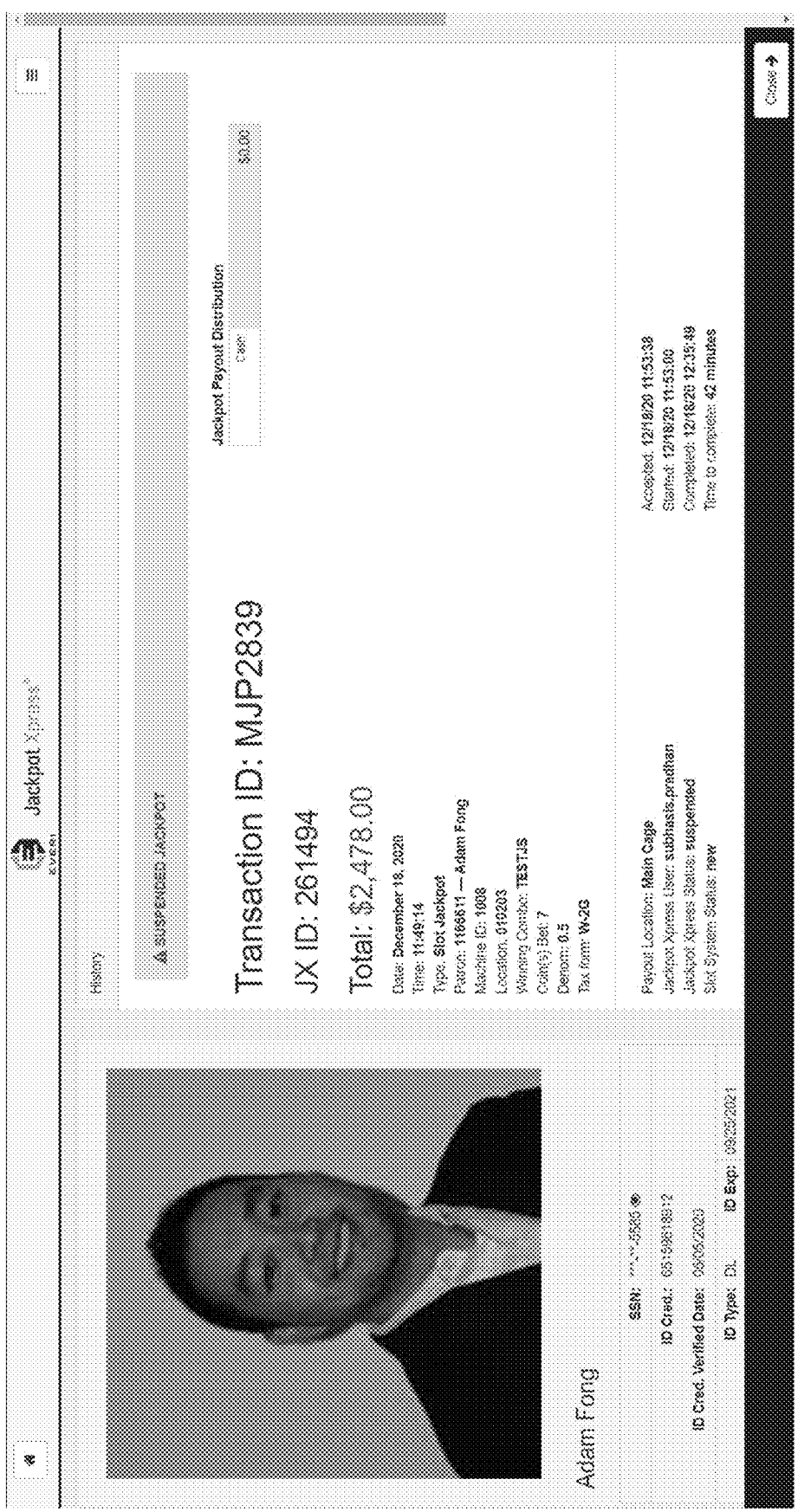
Figure 16:
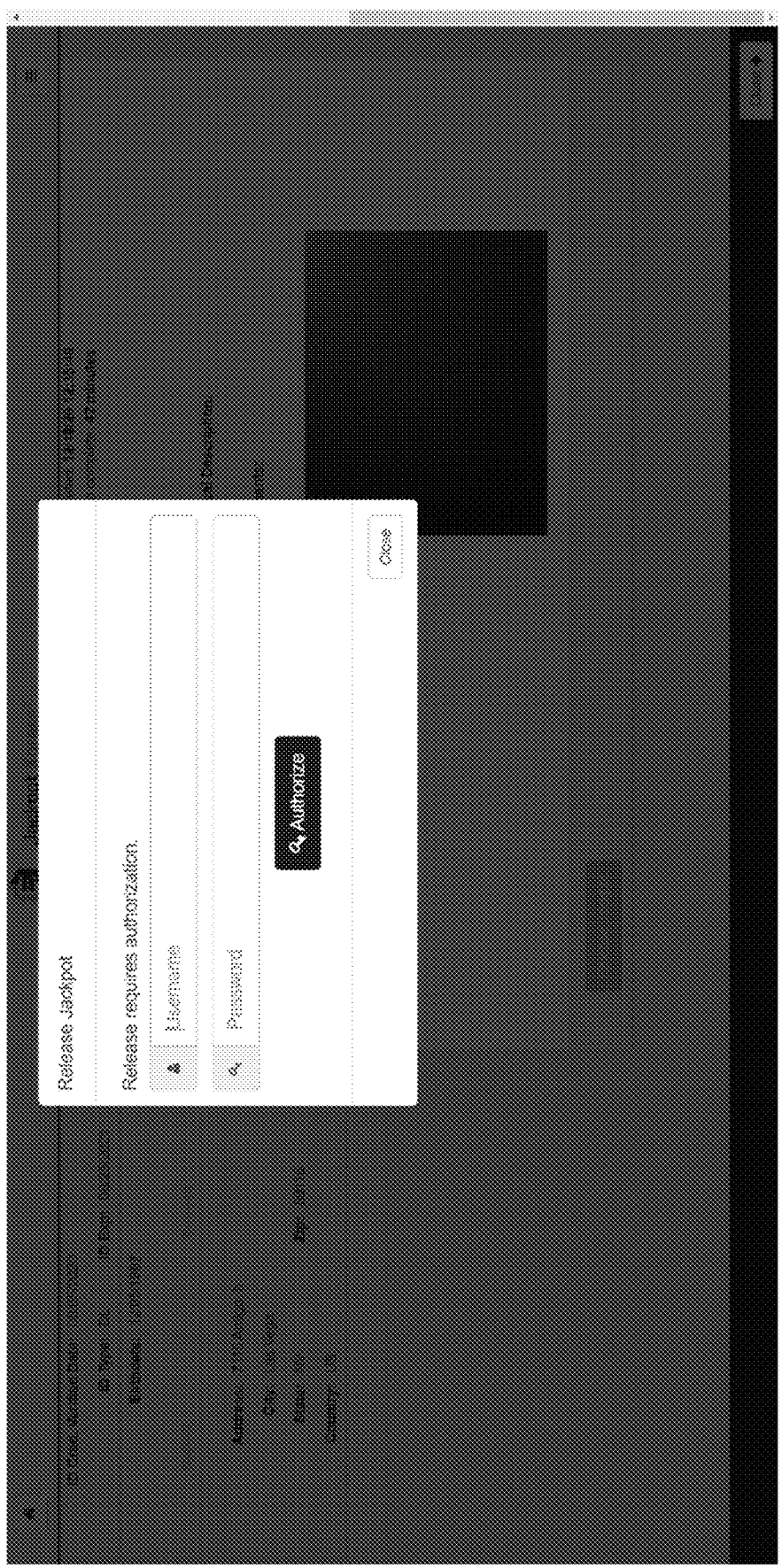
Figure 17:

FIGS. 6-17 are screen shots and flow diagrams relating to an embodiment of jackpot process suspension in accordance with the invention, wherein FIG. 6 is a flow diagram of an electronically implemented method of suspending jackpot processing in accordance with the invention, FIGS. 7-10 illustrate examples of graphical interfaces which may be presented as part of the method, FIG. 11 illustrates an example of a jackpot suspension receipt, FIG. 12 is a flow diagram of an electronically implement method of releasing (such as for further processing) a suspended jackpot, and FIGS. 13-17 illustrate examples of graphical interfaces which may be presented as part of the method of releasing for further processing a suspended jackpot.

This aspect of the invention has numerous advantages, including not only allowing jackpot processing to be suspended, but in a manner which avoids the player needing to provide and ID, which may be the very reason that the jackpot processing can't be completed. Instead, processing can be suspended merely by taking a photograph of the player.

Secondary Service Integration with Jackpot Processing

As one aspect of the invention, jackpot processing may be integrated with other processes or systems. In one embodiment of the invention, the casino C may offer player credit lines (such as directly or via a third party vendor). A player might seek a credit line with the casino or the casino's associated vendor. The player's credit line might be associated with a player tracking account of the casino, a player financial wallet which is managed by the vendor or the like. For example, the credit line might be managed by the casino server 24 (or other server of the casino C) or the financial processing server 28 (or other server of the financial system F).

In one embodiment, when a casino attendant A seeks to process a jackpot, information regarding the player is provided to the system 20, such as the financial server and/or casino server 24, to check whether the player has an outstanding, unpaid credit line. In such event, that information may be provided to the attendant A and some or all of the jackpot may be used to pay down or pay off the outstanding credit line (such as based upon the terms of the credit line). The attendant A may so notify the player, including as necessary, issuing a receipt to the player which comprises evidence that the jackpot was paid and used to pay down or pay off the credit line. Of course, if the jackpot exceeds the amount of the credit line, any overage of the jackpot beyond the amount required to pay the credit line may still be paid to the player.

As another example, the system 20 might be configured to implement one or more wallets or other financial accounts that the player can use to manage funds, including for use in casino wagering or other activities. In one embodiment, when an attendant A processes a jackpot, the attendant A may ask if the player has such a wallet or account. If so, the attendant A may allow the player to associate the jackpot funds with their wallet or account, rather than being paid directly (in some embodiments, the player might be given an incentive for having the jackpot associated with their wallet or account vs. being paid the jackpot). If the player does not have a wallet or account the attendant A may allow the player to create an account, such as by the attendant collecting an approval from the player (such as via a signature or other acceptance, including to the mobile processing device 32), at which point an account or wallet may be created for the player, thus allowing the funds to be deposited thereto.

In other embodiments, when the attendant A processes the jackpot, such as by obtaining information regarding the player's identity (name, etc.), the system 20 may check to determine whether a wallet or account exists for the player. If so, the mobile processing device 32 may prompt the attendant A to allow the player to associate the jackpot funds with the account. If not, the mobile processing device 32 may prompt the attendant A to allow the player to create a wallet or account and then associate the funds.

In one embodiment, this process may be called "wallet" integration, and may have two primary parts:
  a. Part 1—enrolling into a wallet, such as using an interface associated with the mobile processing device 32. Here information collected about the player as part of the jackpot processing (such as, but not limited to one or more of: SSN, name, age, DOB, address, player card info, etc.) is also used by the attendant A via-a-vis the system 20 to enroll the player with a wallet. This saves time from having to collect this information a second time and makes the player experience faster (i.e. guest hits a jackpot, attendant collects patron info, attendant can upsell the patron into cash club wallet with their data+opt in).
  b. Part 2—funding an established wallet using the system 20. When the attendant A processes a jackpot for a player that has a wallet, jackpot processing system has options that allow the player to elect some or all of their post-tax winnings to be deposited to the wallet. This allows the player to manage their winnings in a cashless way.

In yet another embodiment of the invention, the jackpot processing system and features may similarly be integrated with a casino loyalty system, including loyalty system enrollment. This aspect of the system may be similar to that above, wherein actions taken by the attendant A as part of the jackpot processing, including information obtained from the player, may be used to enroll a player in a player loyalty system of the casino C, if the player is not already enrolled (which may be confirmed by the player and/or by passing information regarding the player to the system 20 for validation).

In one embodiment, loyalty integration may have four primary parts:
  a. Part 1—enroll a player into loyalty club or program, such as using an interface associated with the mobile processing device 32. Once again, information collected from or about the player as part of the jackpot processing is preferably utilized in order to enable the loyalty program enrollment.
  b. Part 2—the system, such as the financial server 28, can send the loyalty system (which may be associated with a different server or system, such as the casino server 24) a message to print a player card (or other token) to nearest kiosk or card printer. This request may be put into a queue in the loyalty system and processed by an attendant A so they can get a physical card for the player.
  c. Part 3—Loyalty system/kiosks can offer player the ability to enroll into the paperless tax form program, such as described above. For example, a player may go to a loyalty kiosk and be presented with the option to opt into paperless tax forms. In that event, a message is provided to the system 20 (such the financial server 28) to send all the opt in details and player details.
  d. Part 4—Loyalty system/kiosks can offer players the ability to send themselves tax form and win/loss information. Enrolled players can use a loyalty kiosk/system and select an option to email themselves a copy of their tax forms for the previous tax year as well as win/loss information from that year. The email may be transmitted in the manner described above.

This aspect of the invention may be applied to integration with other systems or services, such as an anti-money laundering (AML) system and service.

Figure 18:
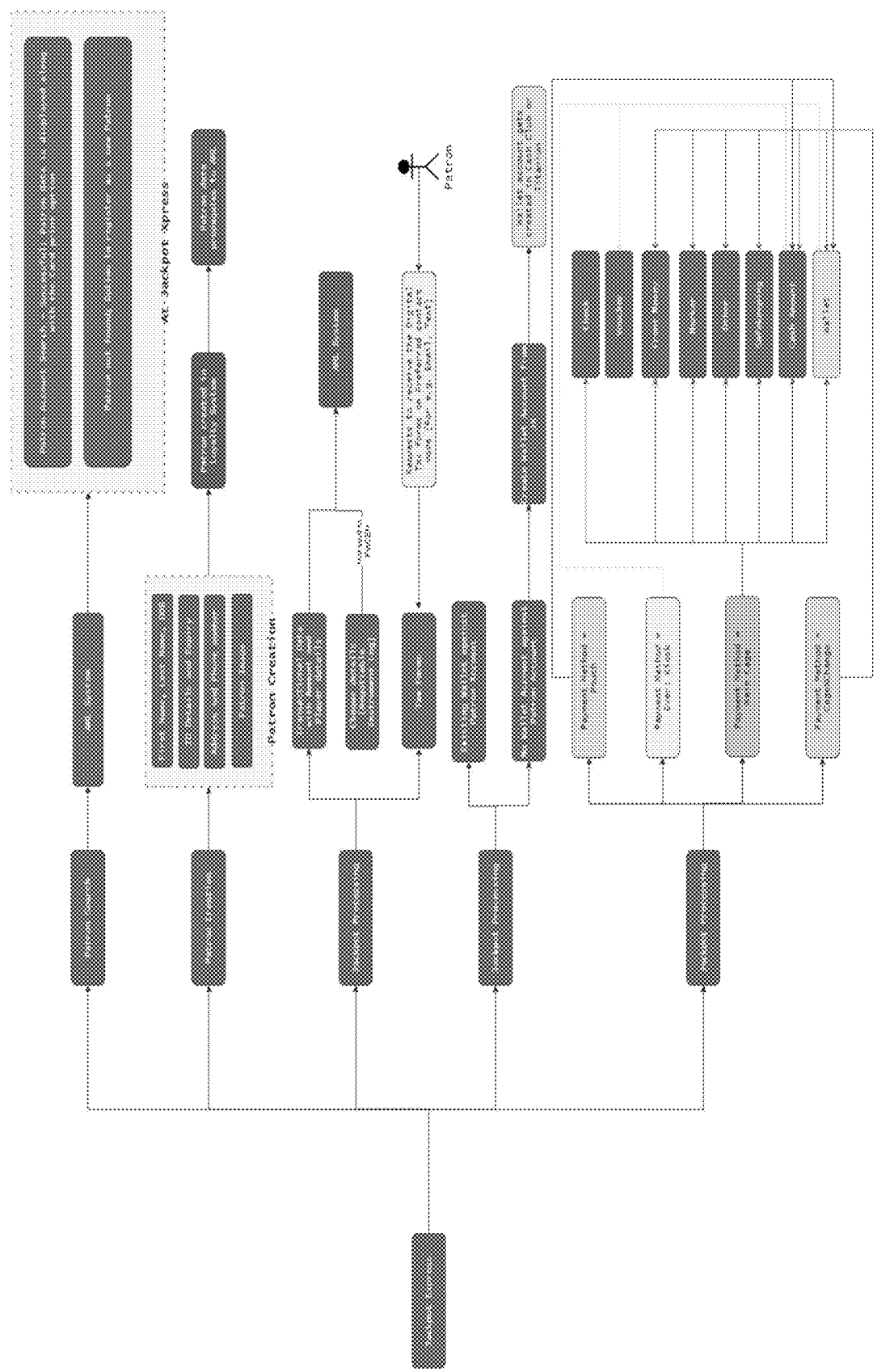
Figure 19:
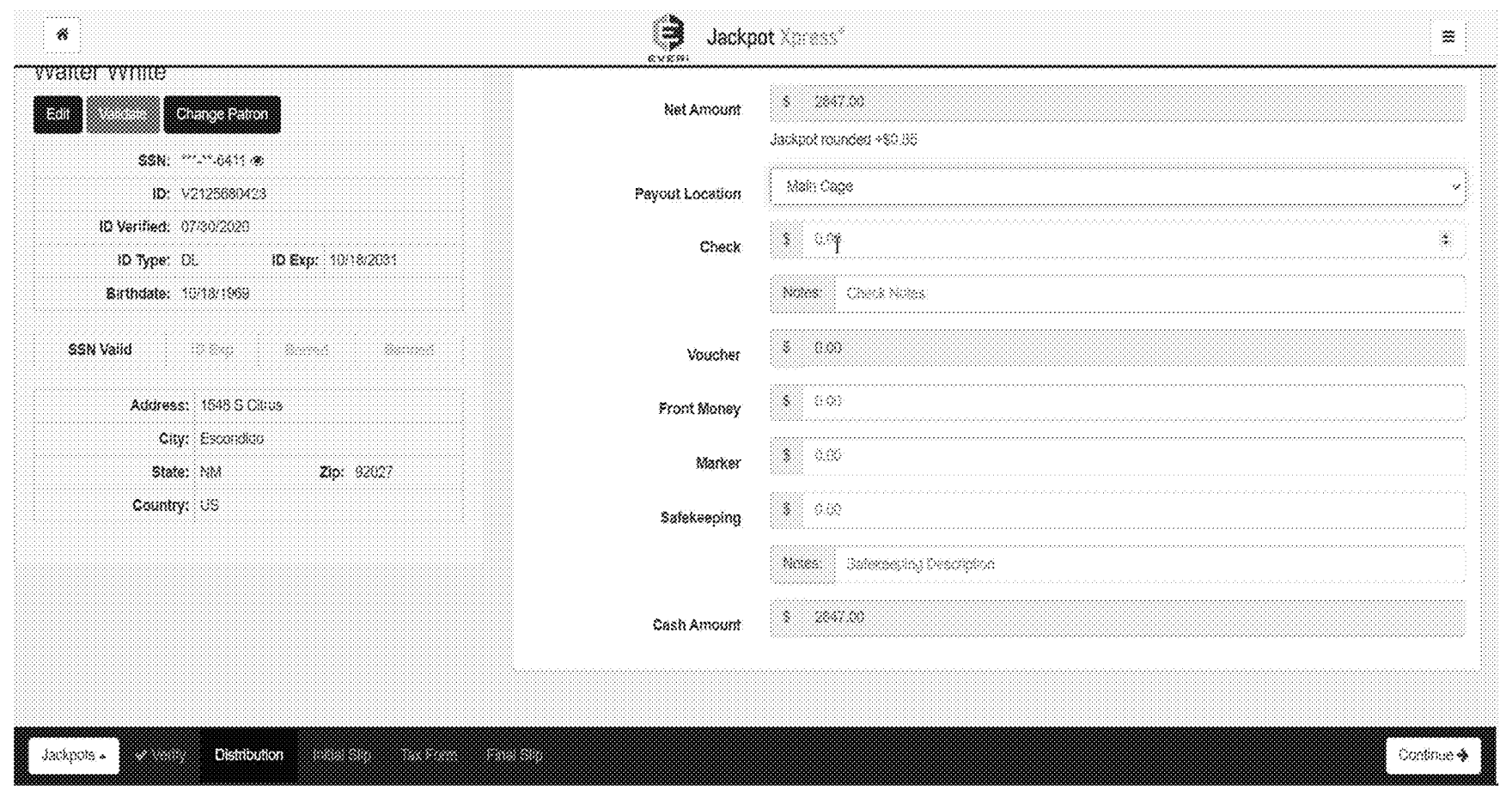
Figure 20:
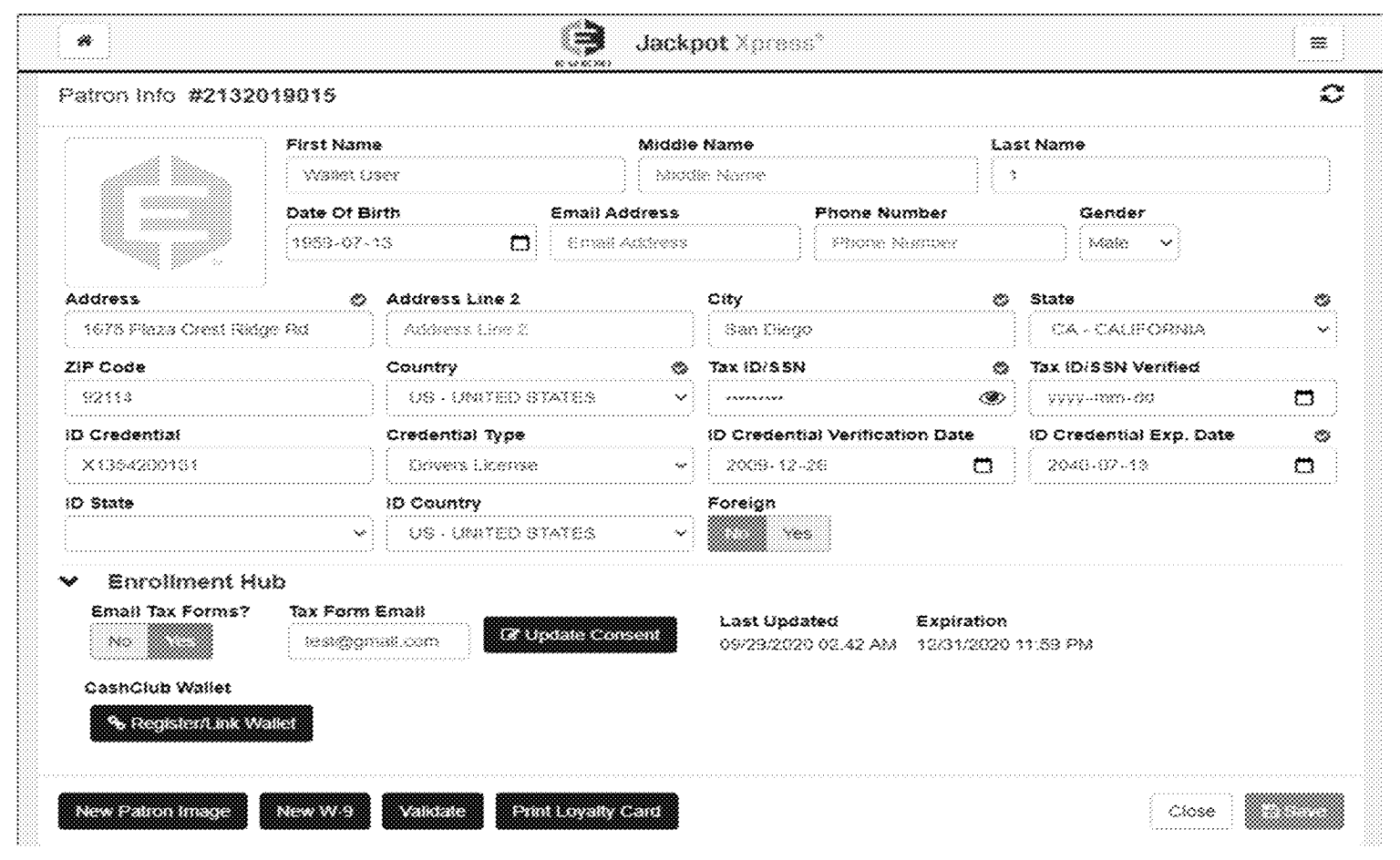
Figure 21:
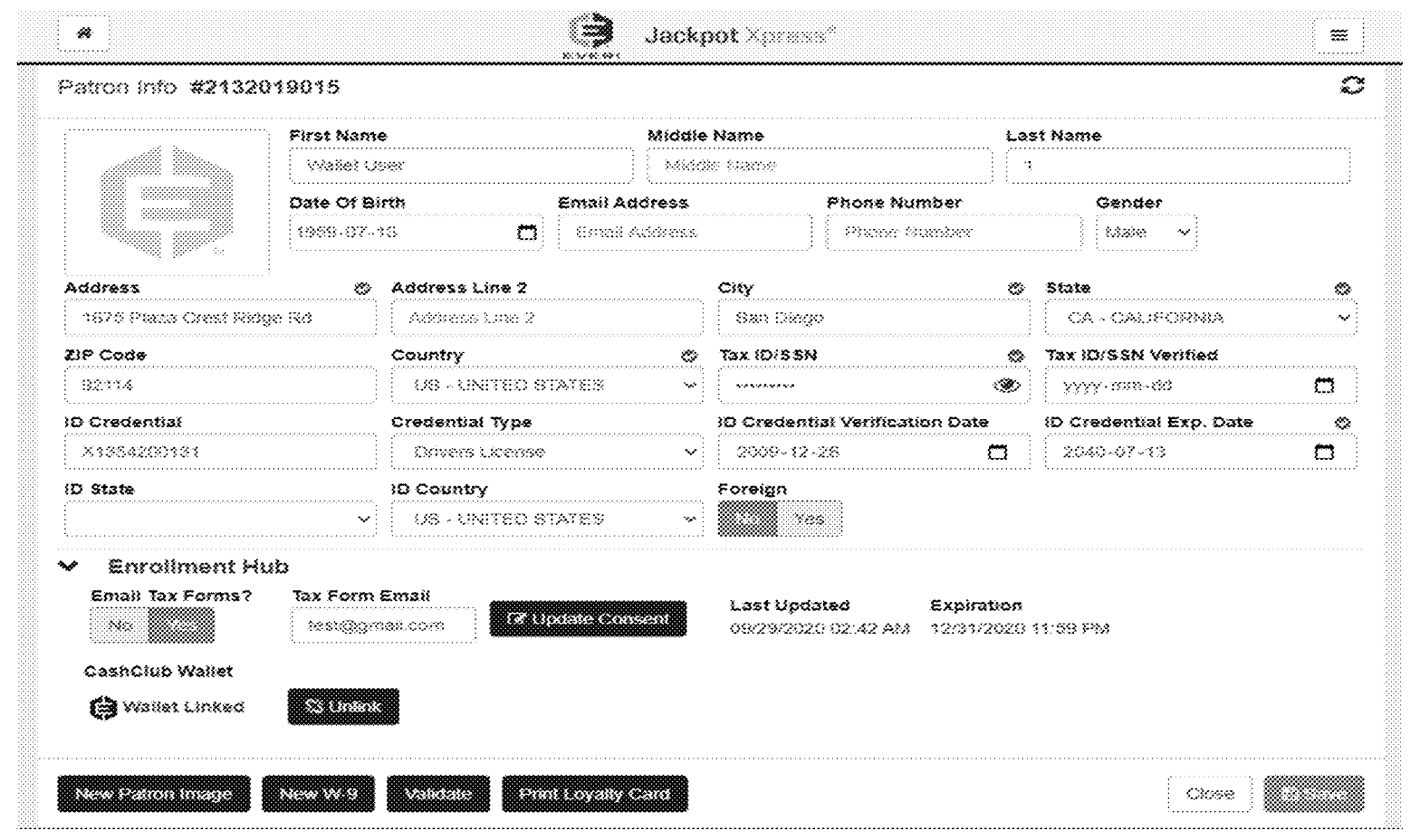
Figure 22:
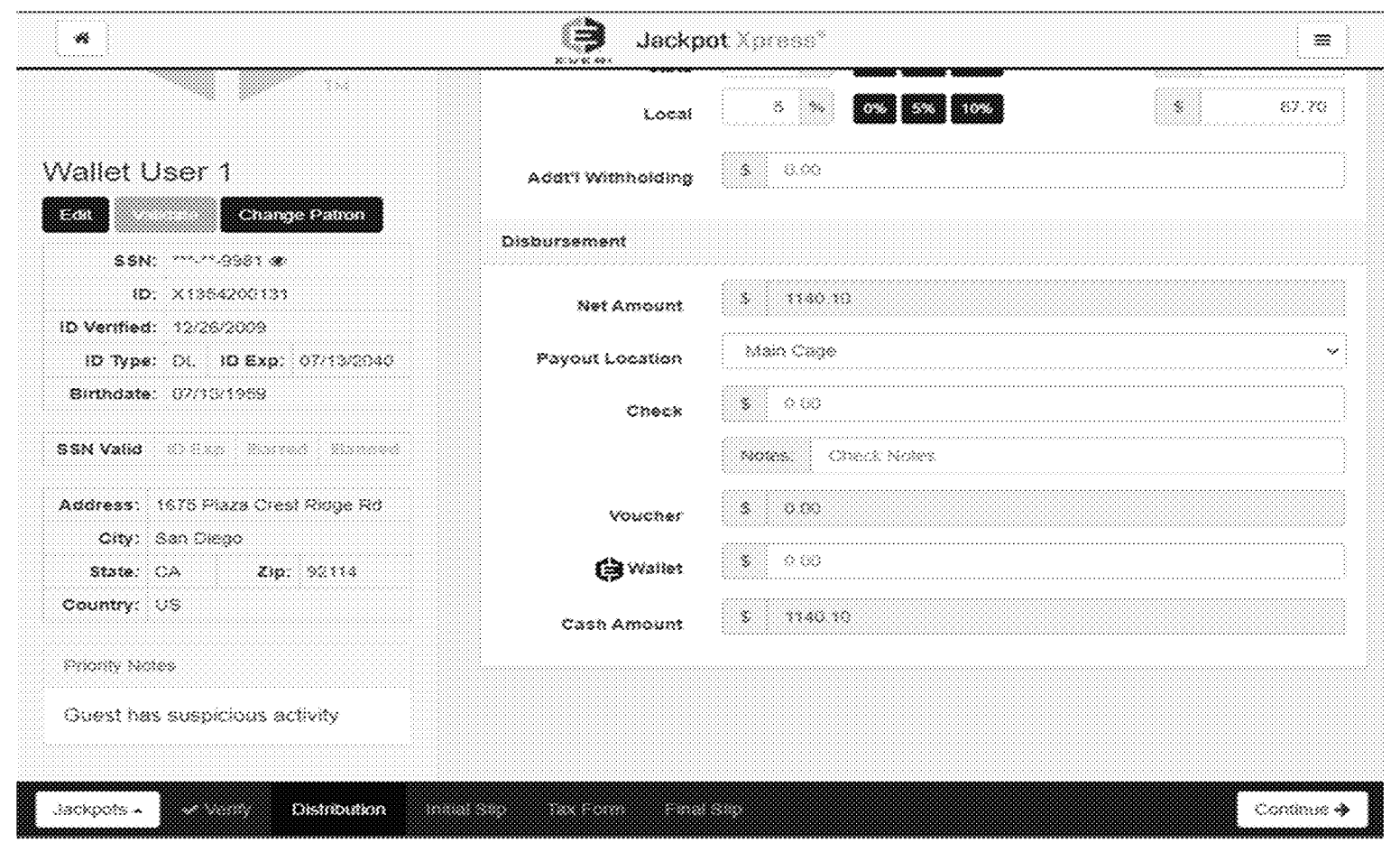
Figure 23:
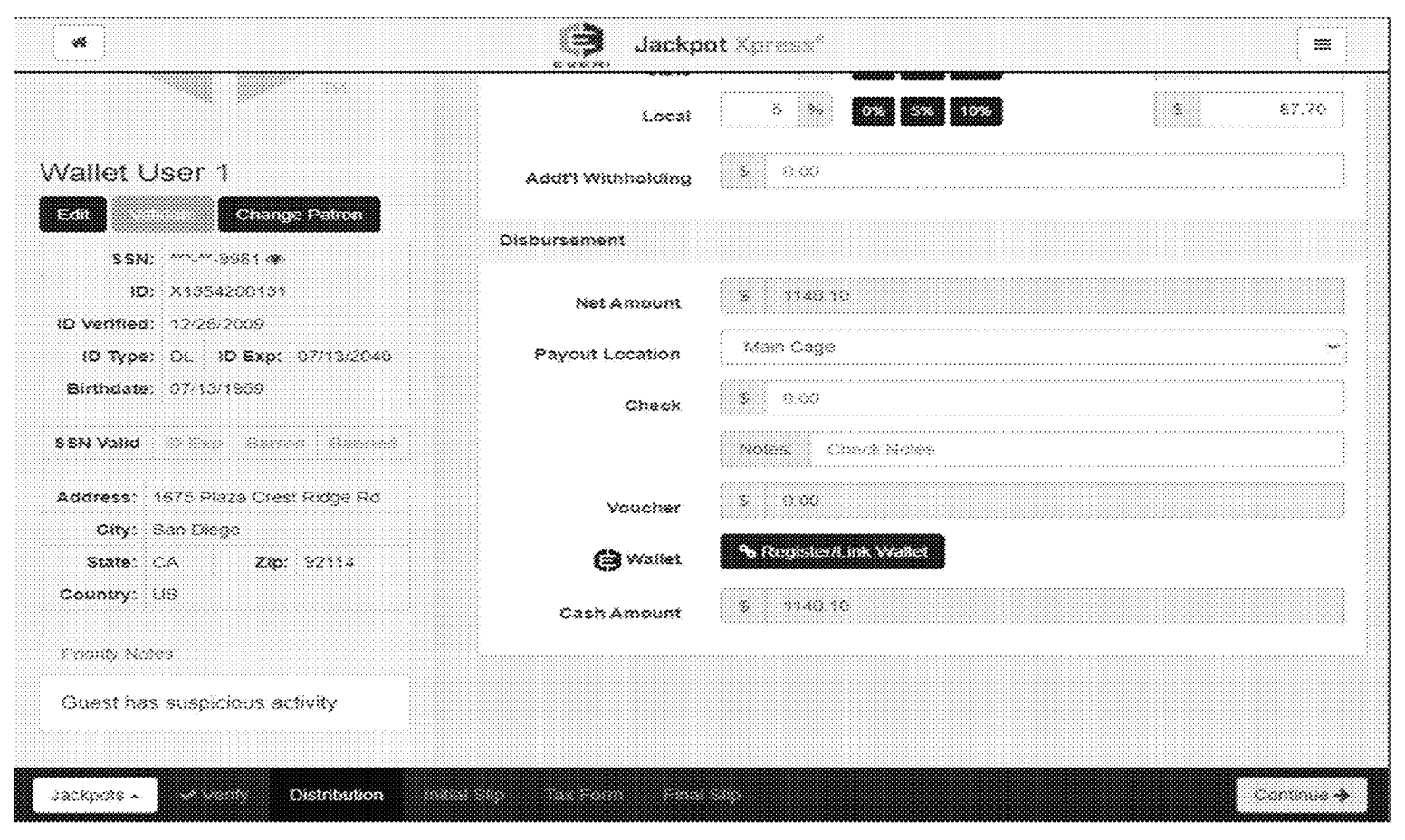
Figure 24:
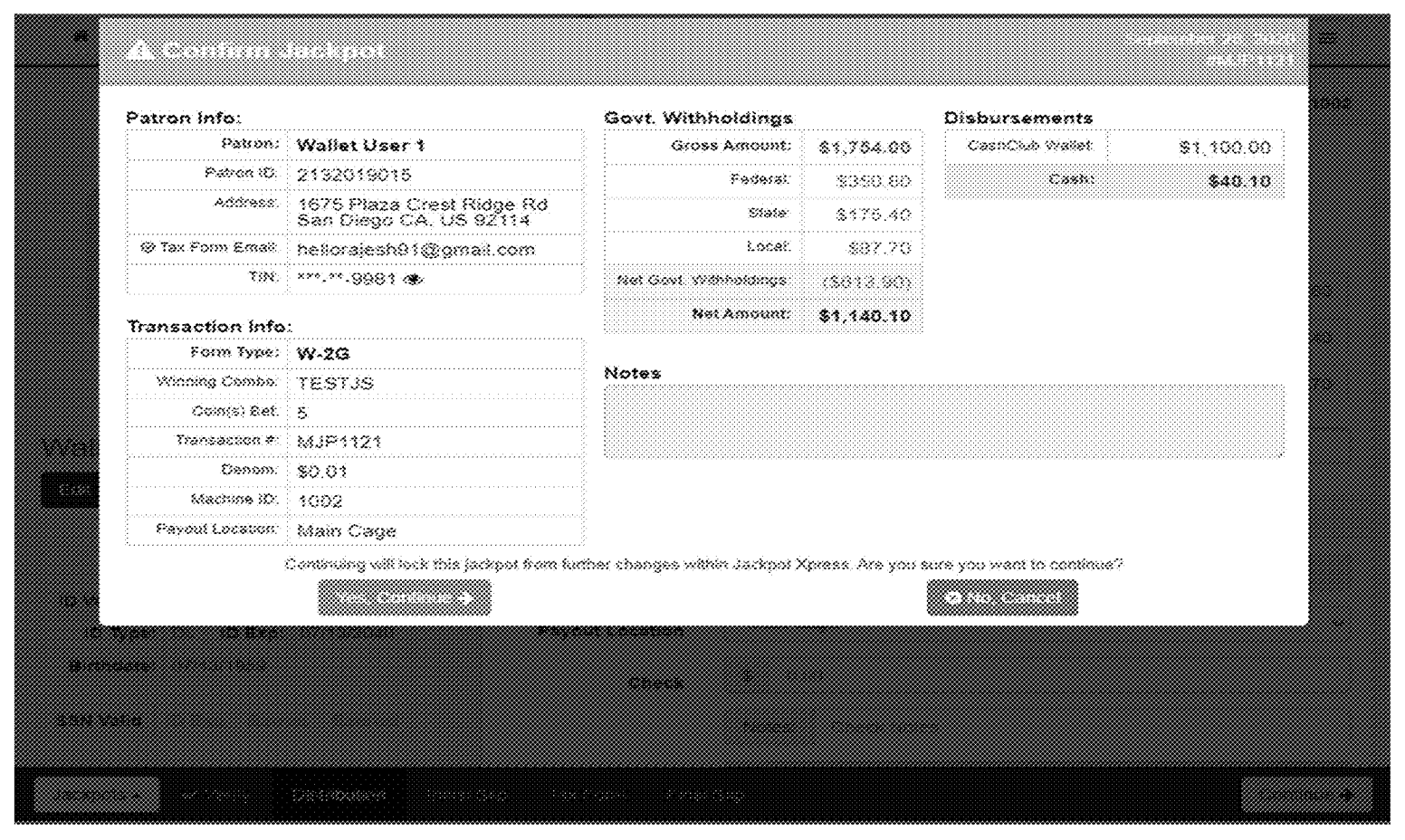

FIGS. 18-24 are screen shots and flow diagrams relating to an embodiment of jackpot processing and secondary service integration in accordance with the invention, wherein FIG. 18 illustrates a flow diagram of an electronically implemented method and configuration of integration of integration of jackpot processing with associated systems, and FIGS. 19-24 illustrate examples of graphical interfaces which may be presented to display information regarding a player, including aspects of linking or unlinking the player information/account to other systems/features.

Jackpot Pouch Management

In accordance with embodiments of the invention, when an attendant A processes a jackpot, they may pay out the jackpot in various manners (except, as noted above, that in some embodiments processing of the jackpot may be suspended and the jackpot may be later paid at a cashier station or in other manners).

First, the jackpot might be paid in one or more forms. For example, the jackpot might be paid out via one or more monetary value tickets or vouchers (that can, for example, be presented to the game or another gaming machines for associating value therewith) and/or currency. The attendant A might, for example, complete processing of the jackpot at a kiosk 30 so as to obtain one or more monetary value tickets for payment to the player.

When the attendant A pay the player at least partially in currency, the attendant A might obtain the currency from a kiosk. In other embodiments, however, the attendant A may pay the player currency from a pouch P. The pouch P essentially comprises a store of currency.

In one embodiment, an attendant is provided a pouch P with an amount of funds, such as at the beginning of their shift. The financial server 28 may track the amount of funds in associated with the pouch P, such as based upon a starting amount, amounts paid out from the pouch, and replenishments to the pouch P. As one example, each time the attendant A processes a jackpot (whether via the mobile processing device 32 or kiosk 30), the attendant A may designate the manner of payment. As noted above, a jackpot payment may be "assigned" to an attendant, such as when a notification of a jackpot is received by the financial server 28 from a gaming machine or the gaming system. Upon such a notification, the jackpot may be assigned to an attendant to be paid to the player (such as by assignment to a particular attendant or by posting the jackpot and an attendant selecting the jackpot for payment, such as via the mobile processing device 32).

In one embodiment, the attendant may designate the form of payment for the jackpot (again, such as via input to the mobile processing device 32 or by other input to the system). If the designation includes at least some currency payment from the pouch P, that amount is deducted from the pouch P balance. The attendant A may also associate funds with the pouch P. For example, the attendant's pouch P may need to be replenished as it becomes low on funds after payment of one or more jackpots. In one embodiment, the attendant A may, for example, replenish their pouch P via a kiosk 30.

For example, the attendant A may review all paid jackpots, such as displayed by their mobile processing device 32 (or the kiosk 30) and seek a replenishment of funds for selected paid jackpots. In one embodiment, this may comprise the act of "selling" the paid jackpots (where the one or more jackpots to be "sold" to the system 20 may be referred to as a "batch").

In one configuration, upon input from an attendant seeking to sell a batch of jackpots, the mobile processing device 32 may transmit information to the financial server 28 regarding the batch. The system, such as the financial server 28, may generate and transmit a redemption code (which might be a numerical, alpha, alpha-numerical code, or graphical code, such as a bar code) which is transmitted to the attendant A, such as their mobile processing device. The attendant A may enter this redemption code into the kiosk 30, which then transmits the code back to the financial server 28 for validation. If the code is invalid, the transaction is ended. If it is validated, the amount of the payment is validated to the kiosk 30. In response, the kiosk 30 may dispense currency to the attendant A in order to replenish the attendant's pouch with currency.

For example, an attendant A might start with a pouch balance of $5000 at the beginning of a shift. The system might notify the attendant A of a $2000 jackpot at a particular machine (such as where the financial server 28 or another server of the system is notified of the jackpot from the gaming machine or through a gaming system), such as by sending a notification to the attendant A (such as via their mobile processing device 32). The attendant A may travel to the gaming machine and pay the player the $2000 jackpot from their pouch, leaving a balance of $3000. At that time, or a later time, the attendant A may review the paid jackpot and designate it for sale (such as via input to their mobile processing device 32) travel to a kiosk 30 (and log in) in order to "sell" that jackpot back to the system and replenish the pouch. This may comprise designating the paid jackpot for sale (see FIG. 27), such as via input to the mobile processing device 32. The system, such as the financial server 28, may generate and transmit a redemption code which is transmitted to the attendant A, such as their mobile device. The attendant A may enter this redemption code into the kiosk 30, validating the sale/redemption. In response, the kiosk 30 may dispense currency to the attendant A (such as $2000 in this case) in order to replenish the attendant's pouch. At the end of a shift, the attendant A might return their pouch to a cashier (such as for counting by a cashier) or a currency recycler (such as for automatic processing of the currency therein) to determine an ending pouch balance. This ending pouch balance is reconciled against the amount of funds tracked by the financial server 28 (starting balance less jackpot amounts paid plus replenishment amounts) to verify the ending pouch balance is correct.

In one embodiment, the financial server 28 may generate and store, such as in an associated database, information regarding each pouch and its associated balance information. Each pouch might be identified by a unique ID, or might be associated with a particular attendant A. For example, information regarding a pouch may be associated with a particular attendant A, whereby each time the attendant A logs into the kiosk 30, transactions are associated with the pouch of that attendant/user.

Figure 25:
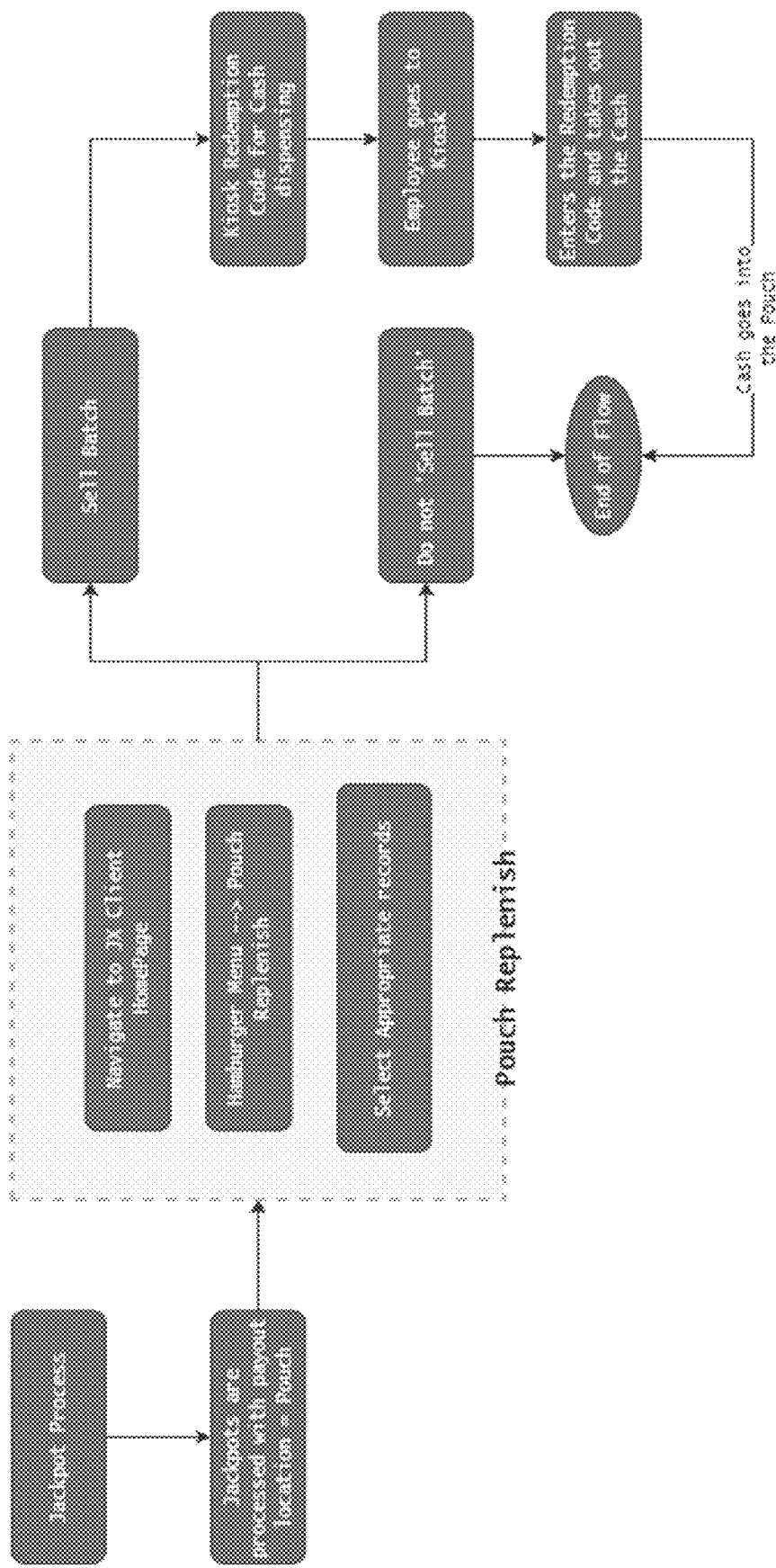
Figure 27:
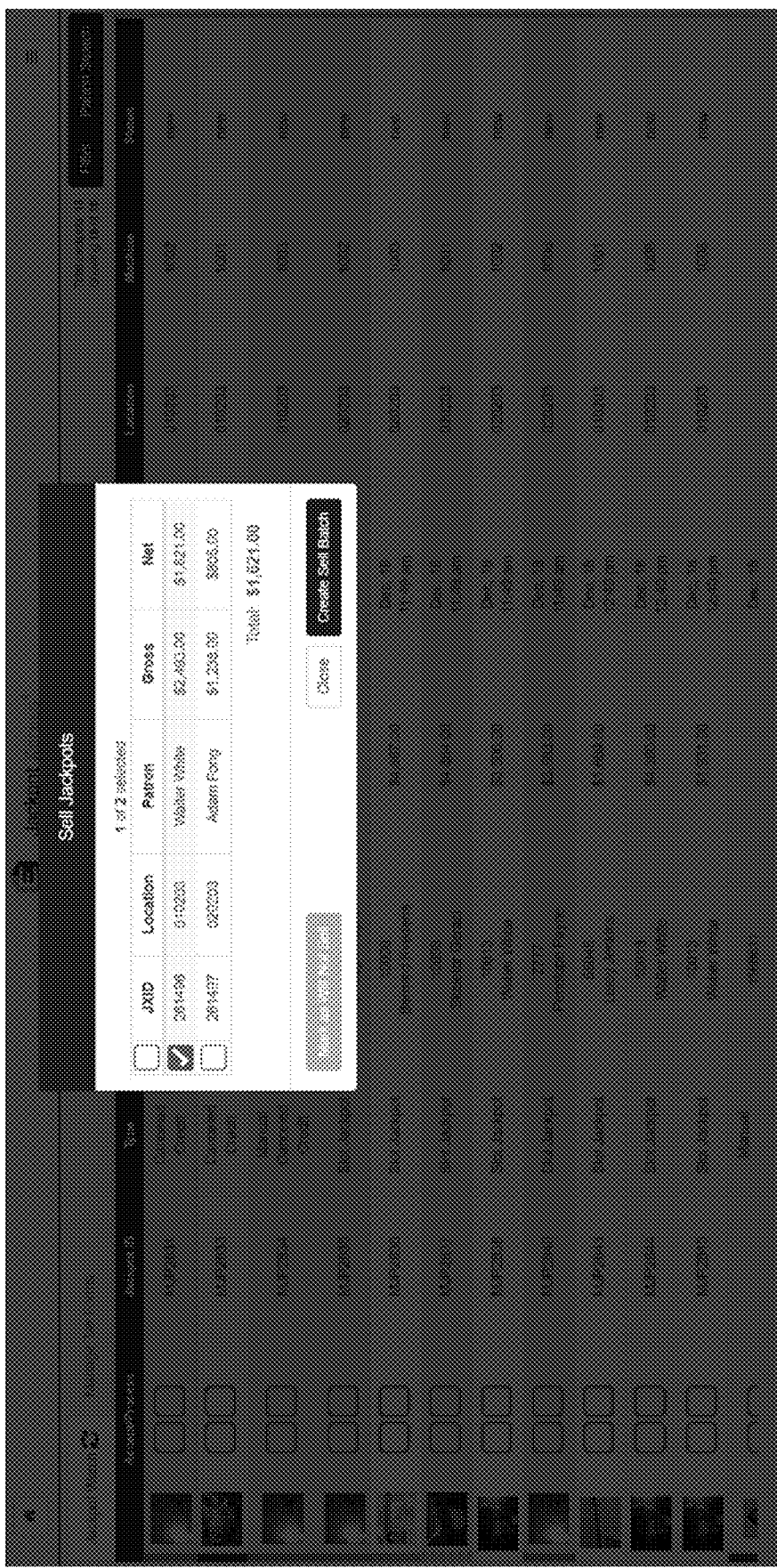
Figure 28:
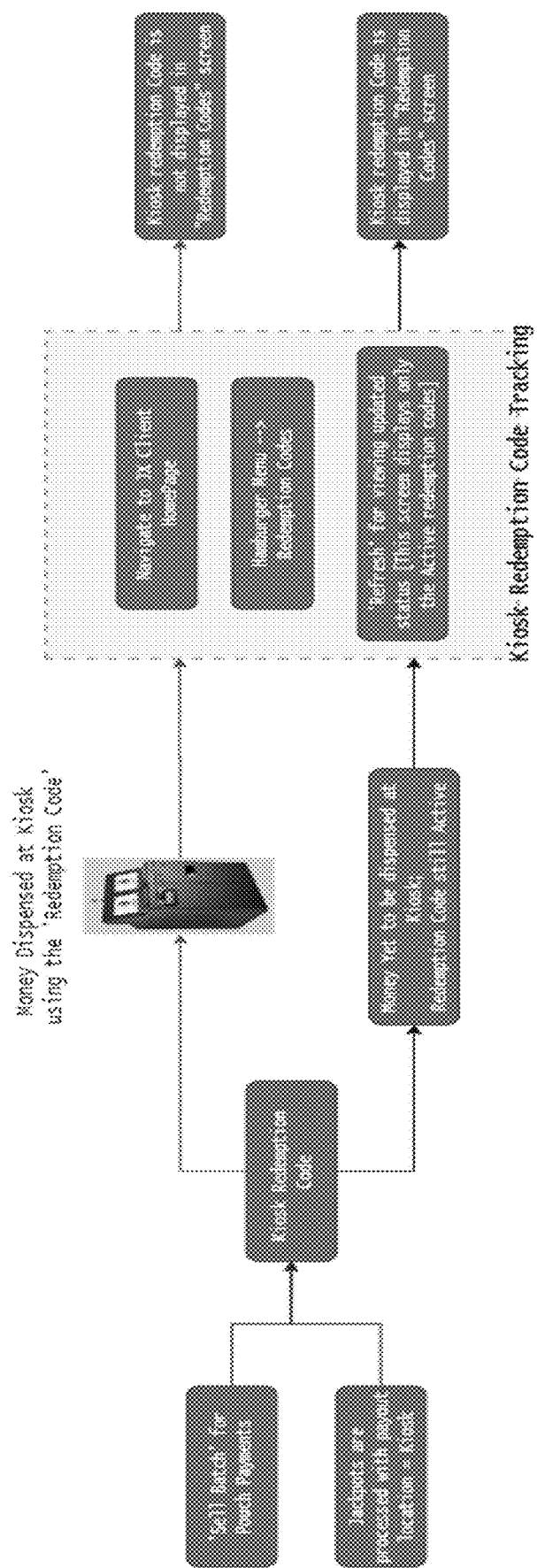
Figure 29:
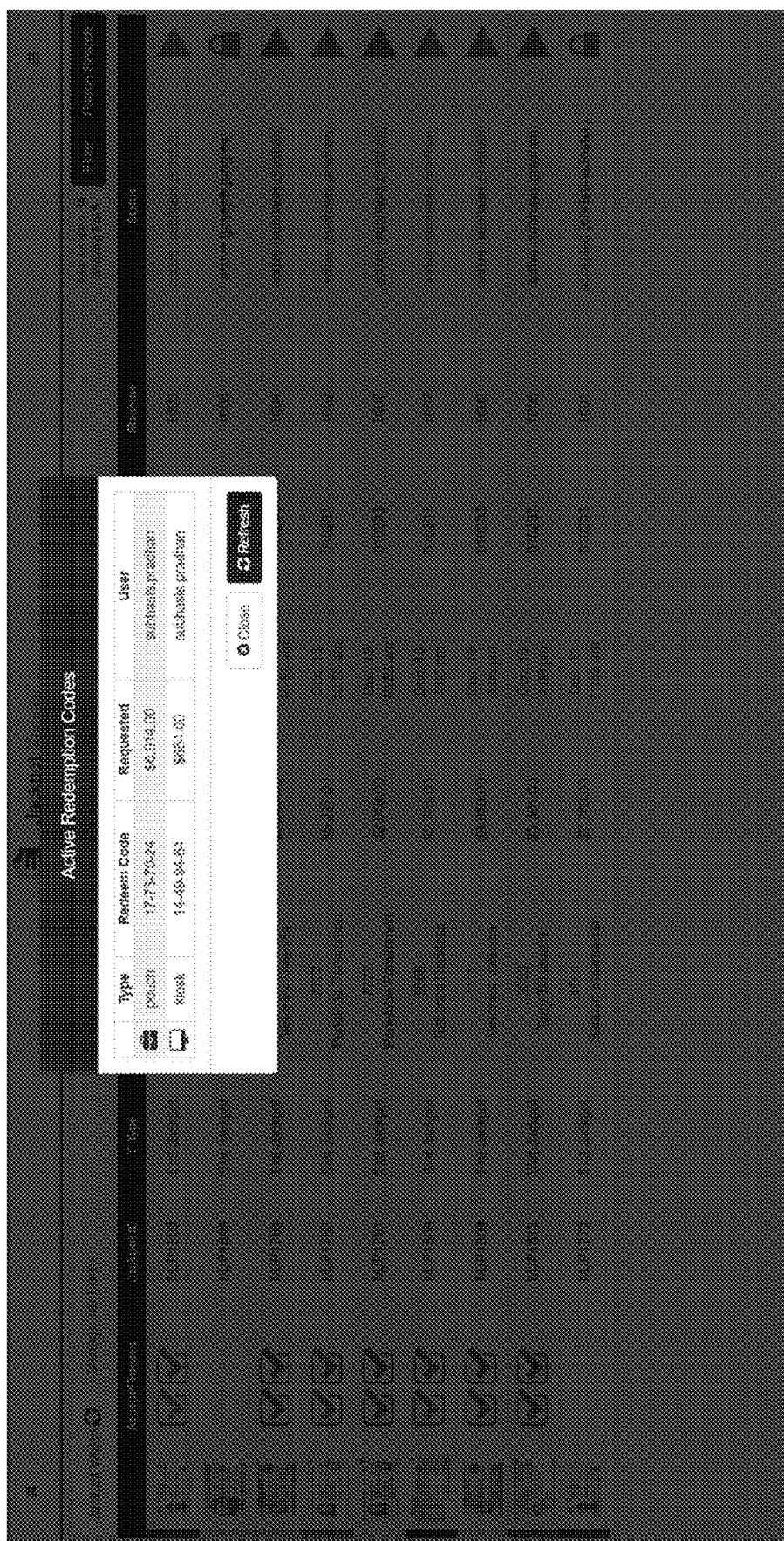

FIGS. 25-29 are screen shots and flow diagrams relating to an embodiment of jackpot pouch management in accordance with the invention, wherein FIG. 25 is a flow diagram of an electronically implemented method of replenishing a pouch, and FIGS. 26-27 illustrate examples of graphical interfaces which may be displayed as part of a method of replenishing a pouch, FIG. 28 is a flow diagram of an electronically implement method of making a jackpot payment using a kiosk and FIG. 29 illustrates an example graphical interface which may be presented as part of processing a jackpot payment.

Tip Processing

Another embodiment of the invention comprise a method and system for processing tips, and particularly tips from patrons of a gaming environment. As one example of the invention, when a player wins a jackpot as described above, the player may wish to tip the attendant or other casino personnel (drink server, etc.). Further, a player might wish to tip in other circumstances, such as by tipping the dealer at a card table, the croupier at a roulette table or the like.

In a preferred embodiment of the invention, a tip is electronically processed. For example, relative to the system 20 described above, as part of jackpot processing, a player may indicate their desire to provide a tip to one or more parties, such as the attendant A. As part of the jackpot processing, the player (or the attendant A, at the direction of the player) may input the amount of the tip, such as to the mobile processing device 32. The player may also select (by direct input or input via the attendant A) one or more recipients for the tips. The recipients might be selected by name, a badge number or other identifier.

When a tip is indicated, it may be deducted from the amount of the jackpot to be paid to the player. The financial server 28 may then track the amount of the jackpot in relation to the amount paid to the player and the amount of the one or more tips. The amount of the one or more tips may be associated with one or more other accounts or the like, such as a common tip account or a tip account of a particular recipient. The tips may then be processed by the financial server 28, such as by payment to the recipients by the casino C (such as part of a payroll process, or various other means).

The system 20 might facilitate tipping by a player or patron in other manners. For example, the system 20 might permit a player to tip one or more recipients from a casino account or financial wallet having funds therewith, or from one or more external accounts (such as a bank account, credit card or the like), preferably as processed by the financial server 28. Such processing might be facilitated by an attendant A via use of a mobile processing device 32, or by a player's interaction with a gaming device 22 or a kiosk 30.

In one embodiment, the player may be provided with a receipt that evidences their tip. A report may also be generated which reflects the tip (and associated information, including the identity of the player, recipient, amount of tip, etc.).

Figure 30:
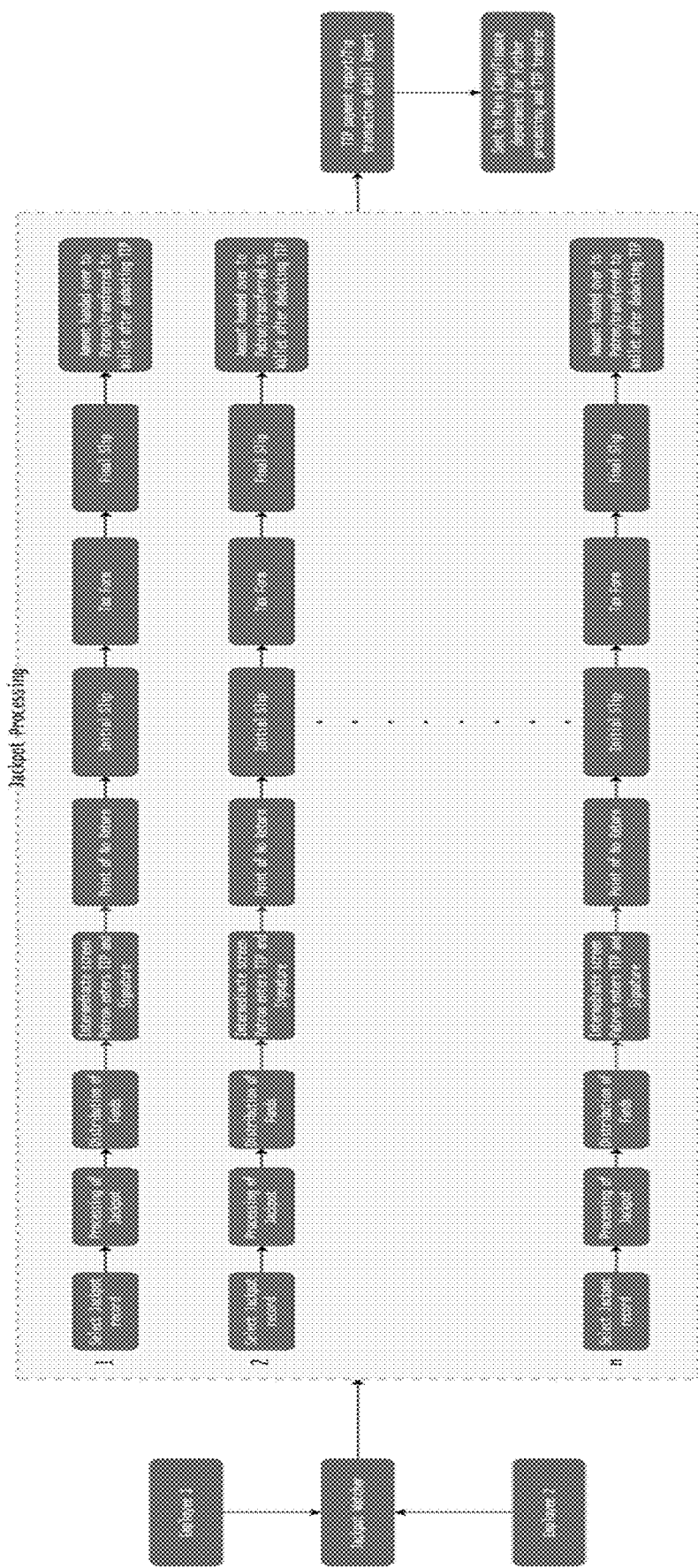
Figure 31:
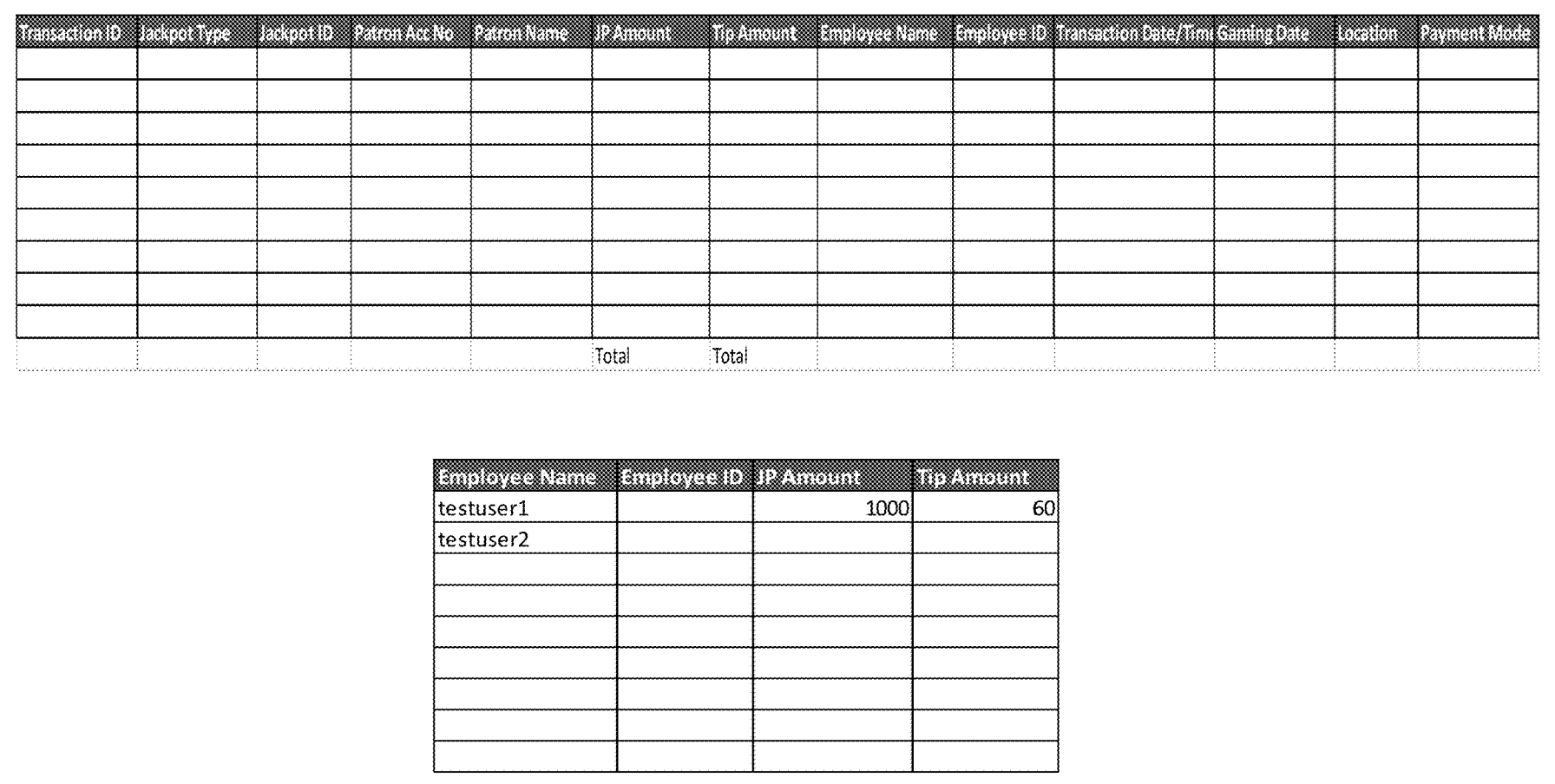

FIGS. 30-31 are screen shots and flow diagrams relating to an embodiment of a tipping feature in accordance with the invention, wherein FIG. 30 illustrates a flow diagram of a method of processing a tip in accordance with the invention, and FIG. 31 illustrates an example tipping report.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for generating and securely transmitting gaming win reporting forms to a player comprising:
a mobile attendant device, the attendant device comprising a processor configured to execute machine readable code, a memory, a display device, at least one user input device and machine-readable code stored in the memory;
a jackpot processing system comprising a processor configured to execute machine readable code, a memory, a communication interface, and machine readable code stored in the memory the executable by the processor;
the machine readable code of the jackpot processing system configured to cause the processor thereof to, in response to receiving an indication of an occurrence of a designated game win by a player, generate one or more game win forms relating to the game win;
the machine readable code of the jackpot processing system configured to cause the processor thereof to generate a code which designates an access location of said one or more game win forms;
the machine readable code of the mobile attendant device configured to cause the processor thereof to display the code via the display device thereof to said player;
the machine readable code of the jackpot processing system configured to cause the processor thereof to receive a request for access to said one or more game win forms from a player computing device generated from input of said code to said player computing device; and
the machine readable code of the jackpot processing system configure to transmit information representing said one or more game win forms to said player computing device in response to said request.

2. The system in accordance with claim 1, wherein said jackpot processing system comprises a jackpot processing server which is configured to generate said one or more game win forms and a jackpot webserver which is configured to receive said request and, in response to said request, obtain said information regarding said one or more game win forms and transmit said information to said player computing device.

3. The system in accordance with claim 1, wherein said code comprises a machine-readable code.

4. The system in accordance with claim 1, wherein said machine-readable code designates a system address corresponding to a location of said one or more game win forms.

5. The system in accordance with claim 1, wherein said information represents images of said one or more game win forms.

6. The system in accordance with claim 1, wherein said jackpot processing system further comprises machine readable code which causes said processor to collect information regarding the player from a remote source and cause the mobile attendant device to display the one or more game win forms relating to the game win, the one or more game win forms populated with the information regarding the player and information regarding the game win.

7. A system for generating and securely transmitting gaming win reporting forms to a player comprising:
a jackpot processing server comprising a processor configured to execute machine readable code, a memory, a communication interface, and machine readable code stored in said memory said executable by said processor;
a public facing email server in indirect communication with said jackpot processing server via a secure communication module;
said jackpot processing server configured to, in response to receiving an indication of an occurrence of a designated game win by a player, generate one or more game win forms populated with said information regarding said player and information regarding said game win; and said public facing email server configured to, in response to a forms request received from a remote communication device of said player, transmit a request for information regarding said one or more game win forms from said jackpot processing server via said secure communication module and, in response to receiving said information from said secure communication module, generate and send an email to said player with information regarding said one or more game win forms.

8. The system in accordance with claim 7, wherein said public facing email server communicates with said secure communicate module via an SSL protocol.

9. The system in accordance with claim 7, wherein said public facing email server is communicatively separated from said jackpot processing server via a firewall.

10. The system in accordance with claim 7, wherein said jackpot processing server is communicatively linked to at least one casino system and obtains information for use in generating said one or more game win forms from said at least one casino system.

11. The system in accordance with claim 10, wherein said jackpot processing server and at least one casino system reside behind a firewall and said public facing email server is communicatively positioned outside of said firewall.

12. The system in accordance with claim 10, wherein said at least one casino system comprises at least one of a casino CMS system, accounting system and loyalty system.

13. The system in accordance with claim 7, further comprising a data storage device which is communicatively linked to said jackpot processing server, said one or more game win forms stored at said data storage device.

14. The system in accordance with claim 7, wherein said information regarding said game win forms comprises said one or more game win forms in PDF format.

15. The system in accordance with claim 7, wherein said forms request is received from a webserver via a request from said remote communication device of said player to said webserver.

16. A method for generating and transmitting gaming win reporting forms to a player comprising the steps of:
generating, at a jackpot processing server, a gaming win reporting form in response to a gaming win by a player;
storing, in a database associated with said jackpot processing server, said gaming win reporting form;
receiving, at a public facing email server, a request to access said gaming win reporting form from a player's computing device;
transmitting, from said public facing email server to a secure communication module, a request for said game win reporting form;
transmitting, from said secure communication module to said jackpot processing server, said request for said game win reporting form;
transmitting, from said jackpot processing server to said public facing email server via said secure communication module, information representing said game win reporting form; and
generating and transmitting, from said public facing email server, an email providing said game win reporting form to said player.

17. The method in accordance with claim 16, wherein said request for said game win reporting form is transmitted from said public facing email server to said secure communication module using an SSL protocol.

18. The method in accordance with claim 16, further comprising generating a gaming win reporting form access code, causing said access code to be displayed on an attendant device for viewing by a player, and wherein said request for said game win reporting form is received via a communication link to a location designed by said access code.

19. The method in accordance with claim 16, wherein said location comprises a web server which is in communication with said public facing email server.

20. The method in accordance with claim 16, wherein said email provide said game win reporting form to said player as a PDF document.

* * * * *